(12) United States Patent
May

(10) Patent No.: US 11,431,582 B2
(45) Date of Patent: Aug. 30, 2022

(54) SYSTEMS AND METHODS FOR CONTEXT AWARE ADAPTATION OF SERVICES AND RESOURCES IN A DISTRIBUTED COMPUTING SYSTEM

(71) Applicant: FMR LLC, Boston, MA (US)

(72) Inventor: James Everette May, Union, KY (US)

(73) Assignee: FMR LLC, Boston, MA (US)

( * ) Notice: Subject to any disclaimer, the term of this patent is extended or adjusted under 35 U.S.C. 154(b) by 613 days.

(21) Appl. No.: 16/402,556

(22) Filed: May 3, 2019

(65) Prior Publication Data

US 2019/0342184 A1     Nov. 7, 2019

Related U.S. Application Data

(60) Provisional application No. 62/667,430, filed on May 5, 2018.

(51) Int. Cl.
| | |
|---|---|
| *H04L 41/16* | (2022.01) |
| *H04L 41/0823* | (2022.01) |
| *H04L 43/045* | (2022.01) |
| *G06N 20/00* | (2019.01) |

(52) U.S. Cl.
CPC ............ *H04L 41/16* (2013.01); *G06N 20/00* (2019.01); *H04L 41/0823* (2013.01); *H04L 43/045* (2013.01)

(58) Field of Classification Search
CPC .......... G06N 20/00; G06N 3/006; G06N 5/02; G06N 5/04; H04L 41/0823; H04L 41/142; H04L 41/16; H04L 43/045
See application file for complete search history.

(56) References Cited

U.S. PATENT DOCUMENTS

| | | | |
|---|---|---|---|
| 9,234,744 B2 * | 1/2016 | Rhoads ................. | G01B 11/14 |
| 2005/0080555 A1 * | 4/2005 | Parupudi ................. | H04W 4/44 |
| | | | 709/217 |

OTHER PUBLICATIONS

Costa et al., "Architectural Patterns for Context-Aware Services Platforms," Centre for Telematics and Information Technology, University of Twente, 16 pages.
Kabir et al., "Machine Learning Based Adaptive Context-Aware System for Smart Home Environment," International Journal of Smart Home, vol. 9, No. 11. (2015), pp. 55-62, http://dx.doi.org/10.14257/ijsh.2015.9.11.07.

(Continued)

*Primary Examiner* — Normin Abedin
(74) *Attorney, Agent, or Firm* — Proskauer Rose LLP

(57) ABSTRACT

A computerized method of calculating a score characterizing a computing process executed in a distributed computing system includes: receiving, by a computing device, from a first data store in electronic communication with the computing device, one or more numerical features representing an aspect of execution performance of the computing process; receiving, by the computing device, from a second data store in electronic communication with the computing device, a set of numerical multipliers including a numerical multiplier for each feature, each numerical multiplier based on a significance of the associated execution performance aspect of the computing process to the computing process; and calculating, by the computing device, the score based on a sum of features weighted by their associated numerical multipliers, the score indicating a performance of the computing process.

14 Claims, 29 Drawing Sheets

(56) References Cited

OTHER PUBLICATIONS

Nawrocki et al., "Learning Agent for a Service-Oriented Context-Aware Recommender System in Heterogeneous Environment," Computing and Informatics, vol. 35, 2016, 1005-1026.
Nguyen et al., "MONAD: Self-adaptive Micro-service Infrastructure for Heterogeneous Scientific Workflows," University of Illinois at Urbana-Champaign, 10 pages.
Shehzad et al., "A Comprehensive Middleware Architecture for Context-Aware Ubiquitous Computing Systems," Real Time & Multimedia Lab, Kyung Hee University, Korea, 6 pages.

* cited by examiner

2200

2205 A computing device receives, from a first data store in electronic communication with the computing device, one or more numerical features representing an aspect of execution performance of the computing process.

2210 The computing device receives, from a second data store in electronic communication with the computing device, a set of numerical multipliers including a numerical multiplier for each feature, each numerical multiplier based on a significance of the associated execution performance aspect of the computing process to the computing process.

2215 The computing device calculates the score based on a sum of features weighted by their associated numerical multipliers, the score indicating a performance of the computing process.

2305 A computing device receives, from a first data store in electronic communication with the computing device, a set of process scores, each process score representing a performance of one computing process in the set of computing processes.

2310 The computing device receives, from a second data store in electronic communication with the computing device, a set of numerical multipliers, each numerical multiplier associated with one computing process and based on a significance of an execution performance aspect of the computing process relative to the computing objective.

2315 A computing device calculates a computing objective score based on a sum of the process scores weighted by their associated numerical multipliers, the computing objective score indicating a performance of the computing objective.

2405 A context pipeline of a distributed computing system collects context data reflecting a set of computing processes executed within the distributed computing system.

2410 A context services module of the distributed computing system extracts, from the context data, one or more features for each computing process in the set of computing processes, the one or more features representing an aspect of execution performance of the respective computing process.

2415 The features are stored in a context data store of the distributed computing system. In a fourth step 2420, a service discovery service module of the distributed computing system is configured to collect ontology information and define ontology data for the distributed computing system.

2420 A service discovery service module of the distributed computing system is configured to collect ontology information and define ontology data for the distributed computing system.

2425 An ontology manager service module of the distributed computing system configures at least one adaptation record, representing an adaptation action, of the distributed computing system, the at least one adaptation action having at least one cost function, limit, precondition, or expiration.

2430 The adaptation behavior service module sends adaptation signals to at least one adaptation receptor module to initiate adaptation actions. In a seventh step 2435, an exemplar service module of the distributed computing system defines one or more exemplars, each exemplar having a score reflecting a performance of one associated computing process in the set of computing processes.

2435 An exemplar service module of the distributed computing system defines one or more exemplars, each exemplar having a score reflecting a performance of one associated computing process in the set of computing processes.

2440 The exemplar service module defines, for each exemplar, a scoring function for scoring the exemplar based on the context features associated with the exemplar.

2505 A context pipeline of a distributed computing system receives context data reflecting a set of computing processes of the distributed computing system.

2510 A context services module of the distributed computing system extracts, from the context data, one or more features for each computing process in the set of computing processes, the one or more features representing an aspect of execution performance of the respective computing process.

2515 The features are stored in a context data store of the distributed computing system.

2520 The features are provided to an adaptive behavior service module of the distributed computing system via an electronic data communication.

2525 An exemplar service module is called, by the adaptive behavior service module, to calculate a score for each computing process, the score based on a numerical sum of features weighted by associated numerical multipliers, each associated numerical multiplier reflecting a weight of each feature, the score indicating a performance of the computing process.

FIG. 25

SYSTEMS AND METHODS FOR CONTEXT AWARE ADAPTATION OF SERVICES AND RESOURCES IN A DISTRIBUTED COMPUTING SYSTEM

RELATED APPLICATION

This application claims the benefit of U.S. Provisional Patent Application Ser. No. 62/667,430, filed on May 5, 2018 and entitled "Systems and Methods for Context Aware Adaptation of Services and Resources in a Distributed Computing Environment," the contents of which are hereby incorporated herein by reference in their entirety.

TECHNICAL FIELD

This application relates generally to systems, methods and apparatuses, including computer programs, for managing services and resources in distributed computing systems. More specifically, this application relates to adapting, regulating, and optimizing services and resources in distributed computing systems based on contextual information obtained from the environment to achieve computing objectives utilizing a set of computing processes.

BACKGROUND

Service-oriented architecture (SOA) and micro-services are common architectures used today in distributed computing systems such as public and private cloud platforms, private computing networks, and hybrid distributed systems. However, these architectures rarely implement a complete business process by themselves. For example, micro-services are usually combined with other services to deliver a desired value or outcome. It is advantageous to have the fine grained control that is enabled by independent and small (micro) services, especially with the elasticity and scale provided today by cloud computing platforms. These platforms provide granular control over individual services based on local conditions. However, it is not presently possible to automatically adapt and regulate multiple dependent services and resources implemented across one or more distributed computing systems without having context awareness concerning the systems and services that are executing within them. Furthermore, all micro-services and the business processes that they enable are not equal in terms of their criticality or business value. Also, in some cases, adapting an upstream service based solely on local information (e.g., scaling or adding additional instances of a service to accommodate increased traffic) could have a detrimental effect on downstream services depending on the current state of the distributed computing system and the downstream services. In some cases, certain negatively impacted downstream services may support far more critical and valuable business or computing processes than the upstream service.

Therefore, it would be desirable to have a context aware architecture with associated computer systems, methods, and software that could regulate and optimize distributed computing systems (e.g., public cloud, private network or cloud, or hybrid computing systems) by adapting individual resources and services of the distributed system to achieve specified computing or business objectives. The current practice of managing and adapting services independently without context of the overall distributed system and services or without considering the business or computing objectives is not sufficient or effective given the complexity and size of distributed computing systems today. Furthermore, it would also be desirable to have computing systems, methods, and software that can automatically learn how to optimize and adapt the resources and services of a distributed computing system based on examples (exemplars) that are each assigned an ideal score to represent their business or computing priority, value, and criticality. Still further, it would be desirable to have computing systems, methods, and software that can adapt resources and services of a distributed computing system in real time as the context changes to maximize overall computing and business objectives while using the most preferred and/or least cost adaptations. Therefore, there currently exists a need in the industry for computing systems, methods, and software that makes context aware adaptations to resources and services in distributed computing systems to achieve predefined business or computing objectives.

SUMMARY

This invention advantageously fills the aforementioned deficiencies by providing context aware computing systems and methods for adapting services in distributed computing systems, which provides a more efficient and effective use of computing resources. Another objective of the present invention is to automatically learn how to adapt and utilize computing services and resources over time to provide better performance, cost efficiency, and more effective management of a distributed computing system. Another objective of the present invention is to automatically discover interactions and dependencies between computing services and resources to preserve and protect critical business processes that depend on the interactions of multiple computing resources.

The present invention includes methods and computer systems, together with associated computer processes and programs, that execute among a plurality of computing machines connected via a network. In some embodiments, the present invention includes the following components, which can each be implemented in one or more modules (e.g., computing modules): a context pipeline, context services, context data store, ontology manager and data store, exemplar service, computer implemented learning service, adaptive behavior service. Each component can be responsible for or support one or more executable steps. The components and associated computer processes may be associated with the following executable steps.

Context data are collected by a context pipeline. Specific features are extracted and engineered from the context data by a context services module. Features are stored in a context data store. An ontology of services that constitute the distributed system (micro-services, web services, or other resources) is managed by an ontology manager module including the allowed adaptation actions for each service and resource. Exemplar models are defined and assigned ideal scores according to their priorities and criticality via an exemplar service module. The exemplar service module may generate or assist with the generation of one or more algorithms to calculate each score utilizing features from the context data. The learning service module may learn which adaptations are needed in different context states by using exploratory and experimental analysis based on the defined ontology and allowable adaptation actions.

Through its training, the learning service module may generate a trained model. The adaptive behavior service module may utilize the trained model to generate adaptation recommendations based on the current state of the distributed system and/or other external context data available. The adaptive behavior service module may effectuate the adaptations by making API calls to other systems as defined in the allowable actions. The learning service module may continue to evaluate the scores of the exemplar models. Based on the scores, the learning service module may continually adjust its recommendations relative to the current context information with the objective of achieving optimal exemplar scores. The process of generating adaptation recommendations using the trained model, executing the adaptation recommendations by the adaptive behavior service module, and assessing the exemplar scores in relation to the collected context data and extracted features may repeat in an online training mode. Using the trained model, the adaptive behavior service module may initiate adaptations proactively or reactively based on context changes and the scoring algorithm of the defined exemplars.

Various embodiments of the invention may also have one or more of the following optional components, which can each be implemented in one or more modules (e.g., computing modules): a training service, a service discovery service, adaptation receptors, one or more cost functions for ontology actions, a context based rules engine, a batch context learning service, virtual context providers, context control interfaces. These components may provide for optional and alternative ways to process context data, learn how to adapt resources and services of a distributed system and optimize a distributed system to achieve desired business or computing objectives. Furthermore, the computerized processes associated with these components may execute one or more of the following optional executable steps.

The training service module may facilitate training activities to optimize learning and reduce training time. The training service module may also manage activities and transitions from supervised learning, unsupervised learning, reinforcement learning, and online learning. The training service module may also coordinate and orchestrate various combinations of learning algorithms sequentially and/or in parallel. The training service module may initiate retraining of the model when new context features are observed, new services are discovered, exemplars are added or changed, or any other aspects of the distributed computing system change that may invalidate the trained model.

The service discovery service module may automatically discover services and resources in the distributed computing system and add them to the ontology including available adaptation actions for each service. The service discovery service module may make such discoveries by making direct API calls to service providers or by registering to receive change events or notifications from a cloud service provider or other system that manages distributed system services or resources. Furthermore the service discovery service module may be informed of new services by receiving a file or other common data extract from service providers.

The present invention may execute in an advisor mode, in which it will record adaptation recommendations without actually adapting or changing any resources or services. The present invention may make those recommendations viewable and searchable by application programming interface (API) calls and a graphical user interface (GUI). The invention may also send out alerts via various communication channels (e.g., email, short message service (SMS), mobile push, phone call, multimedia message service (MMS), social media messaging, or other known communication channels) for some or all adaptation recommendations.

Adaptation recommendations may be made by the adaptive behavior service module and published as adaptation signals (digital messages) using a publish/subscribe messaging module. Each adaptation signal may be consumed by one or more adaptation receptors. Alternatively, the adaptive behavior service module may communicate adaptation signals directly to one or more adaptation receptors via direct API calls. Adaptation receptors may call one or more APIs to adapt services and/or may execute custom code to achieve an adaptation.

An ontology adaptation action may have one or more cost functions associated with it. The cost could be positive or negative. The cost function may be used to make some adaptation actions more favorable than others, and may be used to give preference to one action over another, even if both actions have the same or similar effect on an exemplar score.

A context based rules engine may be employed to explicitly prescribe one or more actions when the context state satisfies one or more predefined criteria. A context based rules engine may be used with or instead of a learning service module to make adaptation recommendations to services to optimize exemplar scores.

A learning service module may learn using context data that is processed in batch (i.e. once a day or some other frequency) instead of or in addition to context data that is streamed in real-time or near real-time.

Virtual context providers may artificially modify context data to simulate context changes for the purpose of evaluating the adaptations recommended by a trained model and/or a context based rules engine. In some embodiments, the services and resources represented by the context data may not be altered by the virtual context providers, and only the values of the features extracted from the context data may be changed by the virtual context providers to evaluate how the trained model and/or context based rules engine would react to a given a context state.

The system may include a GUI for configuring exemplars, context services, the training service module, the learning service module, the ontology, adaptation actions, the adaptive behavior service module, or any other component of the system. The GUI may call APIs to communicate with the components, services, and data included in the present invention.

The training of the learning service module may be enhanced by analyzing static application log files, server log files, or any other artifacts that may store a history of the past behavior of services, resources, and the state of a distributed computing environment and computing systems. The learning service module may utilize one or more supervised and/or unsupervised learning algorithms for this purpose. Context control interfaces may allow the training service module to manipulate services or resources of the distributed system to affect the context. This manipulation of the context may be used for more effective and efficient training of the model.

The present invention is unique when compared with other known systems and solutions in that it provides methods and systems for adapting and regulating individual systems and resources within distributed computing systems using context of the overall environment. The present invention is also unique in that it provides methods and systems for defining and scoring exemplars that may represent end to end business processes or higher level computing functions. Furthermore, the present invention is unique in that it provides methods and systems for adapting services and resources based on contextual information to achieve an optimal combined exemplar score. The present invention is also unique in that it provides methods and systems for automatically learning what adaptation actions to take in a given context state to achieve maximum performance and value based on defined exemplars.

This disclosure will now provide a more detailed and specific description that will make reference to the accompanying drawings. The drawings and specific descriptions of the drawings, as well as any specific or alternative embodiments discussed, are intended to be read in conjunction with the entirety of this disclosure. However, the disclosed invention may be embodied in many different forms and should not be construed as being limited to the embodiments set forth herein; rather, these embodiments are provided by way of illustration only so that this disclosure will be thorough, complete and fully convey understanding and enablement to those skilled in the art. Furthermore, some common structures and implementation methods that would be well known to one skilled in the art are not fully detailed in order to avoid obfuscating novel aspects of the invention. The drawings are not necessarily to scale; emphasis is instead generally placed upon illustrating the principles of the invention.

In one aspect, the invention features a computerized method of calculating a score characterizing a computing process executed in a distributed computing system. The computerized method includes receiving, by a computing device, from a first data store in electronic communication with the computing device, one or more numerical features representing an aspect of execution performance of the computing process. The computerized method also includes receiving, by the computing device, from a second data store in electronic communication with the computing device, a set of numerical multipliers including a numerical multiplier for each feature. Each numerical multiplier is based on a significance of the associated execution performance aspect of the computing process to the computing process. The computerized method also includes calculating, by the computing device, the score based on a sum of features weighted by their associated numerical multipliers. The score indicates a performance of the computing process.

In some embodiments, the computerized method includes storing the score in a third data store in electronic communication with the computing device. In some embodiments, the score indicates a probability of the computing process performing optimally by reference to a pre-defined ideal performance benchmark. In some embodiments, each of the features represents at least one of health checks, throughput, cycle time, or application log messages of a component or module of the distributed computing system. In some embodiments, calculating the score includes multiplying the score by a time-based penalty function. In some embodiments, the computerized method includes determining whether the score reflects an acceptable level of performance based on a predetermined performance threshold. In some embodiments, the computerized method includes initiating, by the computing device, one or more score adaptation processes in response to a determination that the score has not met the predetermined performance threshold. In some embodiments, a first computing module calculates the numerical multipliers based on training data from one or more supervised examples to minimize a cost function based on a pre-defined ideal performance benchmark of the computing process. In some embodiments, the one or more features are determined using a principal component analysis method based on a set of events occurring within the distributed computing system.

In another aspect, the invention features a computerized method of calculating a score characterizing a computing objective utilizing a set of computing processes executed in a distributed computing system. The computerized method includes receiving, by a computing device, from a first data store in electronic communication with the computing device, a set of process scores. Each process score represents a performance of one computing process in the set of computing processes. The computerized method also includes receiving, by the computing device, from a second data store in electronic communication with the computing device, a set of numerical multipliers. Each numerical multiplier is associated with one computing process and based on a significance of an execution performance aspect of the computing process relative to the computing objective. The computerized method also includes calculating, by the computing device, a computing objective score based on a sum of the process scores weighted by their associated numerical multipliers. The computing objective score indicates a performance of the computing objective.

In some embodiments, each process score is calculated based on (i) a set of features representing an aspect of execution performance of the computing process, and/or (ii) a corresponding second set of numerical multipliers. Each numerical multiplier in the second set of numerical multipliers is based on a significance of an associated execution performance aspect of the computing process to the computing process. In some embodiments, the computerized method includes including optimizing, by the computing device, the computing objective score based on simultaneously optimizing the one or more process scores.

In another aspect, the invention features a computing system for optimizing performance of a computing objective utilizing a set of computing processes executed in a distributed computing system. The computing system includes a context pipeline module for collecting context data characterizing one or more performance aspects of each computing process in the set of computing processes. The computing system also includes a context services module for extracting one or more features from the context data. The computing system also includes a context data store for storing the features. The computing system also includes an ontology manager module for (i) determining allowed adaptation actions of the distributed computing system, (ii) receiving computing resource definition records of the distributed computing system, and (iii) creating adaptation definition records reflecting adaptation actions utilized in the distributed computing system. The computing system also includes an exemplar service module for (i) defining an exemplar model for each computing process, each exemplar reflecting a performance of the computing process, (ii) determining ideal scores for each exemplar model according to their significances to the computing objective, and/or (iii) calculating exemplar scores using the features extracted from the context data. The computing system also includes a learning service module for determining, based on a current context state of the distributed computing system, adaptations to utilize in the distributed computing system in accordance with the allowed adaptation actions determined by the ontology manager module.

In some embodiments, the computing system includes an adaptive behavior service module for executing the determined adaptations in the distributed computing system. In some embodiments, the context services module is configured to do at least one of (i) engineer the features or (ii) scale the features for calculating the representation of the computing objective. In some embodiments, the context data includes at least one of API metrics, click stream data, access logs, third party data, batch process data, application logs, or health check data. In some embodiments, the ontology manager module is configured to determine allowed adaptation actions for multiple services and resources of the distributed system. In some embodiments, the adaptive behavior service module is configured to do at least one of the following: (i) publish determined adaptations as adaptation signals, or (ii) communicate determined adaptations as adaptation signals via direct API calls. In some embodiments, the computing system further includes a training service module for facilitating training activities to optimize learning and reduce training time. In some embodiments, the computing system includes one or more context control interfaces to allow the training service module to manipulate services or resources of the distributed computing system to affect the context data.

In some embodiments, the computing system includes a service discovery service module for automatically discovering services and resources in the distributed computing system and adding them to the ontology manager module. In some embodiments, the computing system includes a context based rules engine module configured to prescribe one or more actions when a context state of the distributed computing system satisfies one or more predefined criteria. In some embodiments, the computing system includes a batch context learning service module configured to learn how to use context data that is processed in batch instead of, or in addition to, context data that is streamed in real time or near-real time. In some embodiments, the computing system includes one or more virtual context provider modules configured to artificially modify context data to simulate context changes to evaluate adaptations recommended by at least one of a trained model or a context based rule engine module. In some embodiments, the system is capable of operating in an advisor mode configured to do at least one of (a) record adaptation recommendations without adapting or changing any system resources or services, or (b) send alerts for some or all adaptation recommendations. In some embodiments, the learning service module is configured to be trained on past context data using one or more supervised or unsupervised algorithms.

In another aspect, the invention features a computerized method of training a computing device to optimize a computing objective utilizing a set of computing processes executed in a distributed computing system. The computerized method includes collecting, by a context pipeline of the distributed computing system, context data reflecting a set of computing processes executed within the distributed computing system. The computerized method also includes extracting, from the context data, by a context services module of the distributed computing system, one or more features for each computing process in the set of computing processes, the one or more features representing an aspect of execution performance of the respective computing process. The computerized method also includes storing the features in a context data store of the distributed computing system. The computerized method also includes configuring a service discovery service module of the distributed computing system to collect ontology information and define ontology data for the distributed computing system. The computerized method also includes configuring, by an ontology manager service module of the distributed computing system, at least one adaptation record representing an adaptation action of the distributed computing system. The at least one adaptation action has at least one cost function, limit, precondition, or expiration. The computerized method also includes sending, by the adaptation behavior service module, adaptation signals to at least one adaptation receptor module to initiate adaptation actions. The computerized method also includes defining, by an exemplar service module of the distributed computing system, one or more exemplars, each exemplar having a score reflecting a performance of one associated computing process in the set of computing processes. The computerized method also includes defining, by the exemplar service module, for each exemplar, a scoring function for scoring the exemplar based on the context features associated with the exemplar.

In some embodiments, the computerized method includes configuring, by a training service module of the distributed computing system, a learning service for iteratively learning relationships between features, adaptation actions, and exemplar scores. In some embodiments, the computerized method includes initializing, by the training service module, training of the learning agent via one or more of (a) supervised learning by providing learning agent context data, adaptations and exemplar scores, and (b) unsupervised learning through observation of context data and exemplar scores with respect to adaptation actions. In some embodiments, the computerized method includes generating a trained model. In some embodiments, the computerized method includes performing, by the training service module of the distributed computing system, reinforcement learning using adaptation actions as actions, context data as state, and exemplar scores and adaptation cost functions as rewards and penalties.

In another aspect, the invention features a computerized method of optimizing a computing objective utilizing a set of computing processes executed in a distributed computing system. The computerized method includes receiving, by a context pipeline of the distributed computing system, context data reflecting a set of computing processes of the distributed computing system. The computerized method also includes extracting, from the context data, by a context services module of the distributed computing system, one or more features for each computing process in the set of computing processes, the one or more features representing an aspect of execution performance of the respective computing process. The computerized method also includes storing, in a context data store of the distributed computing system, the features. The computerized also method includes providing, to an adaptive behavior service module of the distributed computing system, the features via an electronic data communication. The computerized also method includes calling, by the adaptive behavior service module, an exemplar service module to calculate a score for each computing process, the score based on a numerical sum of features weighted by associated numerical multipliers, each associated numerical multiplier reflecting a weight of each feature, the score indicating a performance of the computing process.

In some embodiments, the computerized method includes generating, by the trained model, one or more adaptation recommendations. In some embodiments, the computerized method includes publishing, by the adaptive behavior service module, a set of adaptation signals, one signal for each recommendation generated by the model. In some embodiments, the computerized method includes sending, by the adaptive behavior service module, the set of adaptation signals to an adaptation advice data store. In some embodiments, the computerized method includes receiving, by one or more adaptation receptors of the distributed computing system, the set of adaptation signals. In some embodiments, the computerized method includes determining, by the trained model, a set of adaptations to be initiated. In some embodiments, the computerized method includes executing, by the adaptation receptors, the set of adaptations. In some embodiments, the computerized method includes refining, by the learning service module, over time, the trained model by analyzing the effects of the adaptations on exemplar scores with respect to a given set of context features. In some embodiments, the computerized method includes initiating, by a training service module, additional training when changes are detected to context features, ontology, exemplars, or other components of the distributed computing system.

BRIEF DESCRIPTION OF THE DRAWINGS

FIG. 22 is a flowchart of a computerized method of calculating a score characterizing a computing process executed in a distributed computing environment, according to an illustrative embodiment of the invention.

FIG. 23 is a flowchart of a computerized method of calculating a score characterizing a computing objective utilizing a set of computing processes executed in a distributed computing environment, according to an illustrative embodiment of the invention.

FIG. 24 is a flowchart of a computerized method of training a computing device to optimize a computing objective utilizing a set of computing processes executed in a distributed computing environment, according to an illustrative embodiment of the invention.

FIG. 25 is a flowchart of a computerized method of optimizing a computing objective utilizing a set of computing processes executed in a distributed computing environment, according to an illustrative embodiment of the invention.

DETAILED DESCRIPTION

Figure 1:
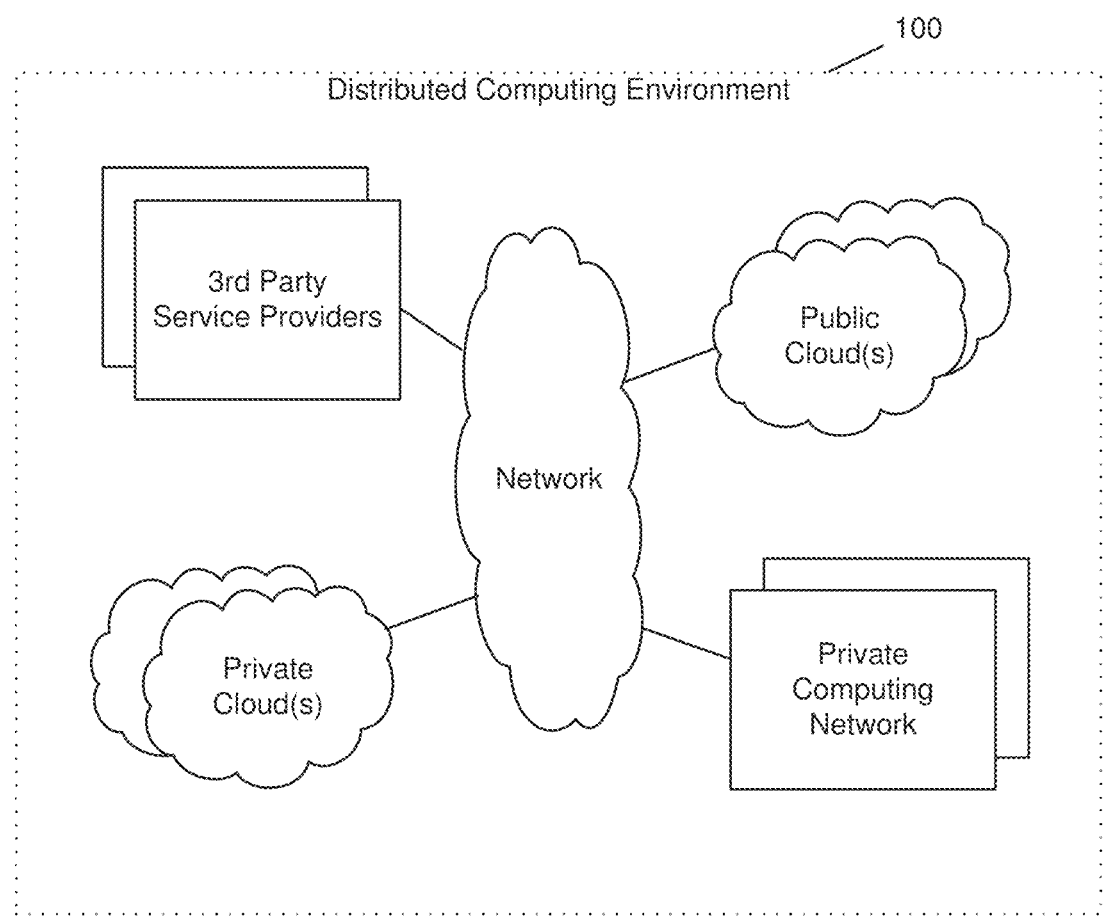
FIG. 1 is a block diagram illustrating an example of a distributed computing environment within which the services and/or resources to be adapted in the present invention may execute.

In one embodiment, the present invention includes the following components, which may be included in one or more computing modules: an ontology 600, computing resource definitions 610, adaptation definitions 620, a service discovery service 700, a context pipeline 800, a real time context service 810, a recency context service 820, an historic context service 830, a context subscription queue 840, a context repository 850, an exemplar service 900, a learning service 1000, a trained model 1010, a training service 1020, context control interfaces 1030, an adaptive behavior service 1200, adaptation receptors 1210, an adaptation advice data store 1220, configuration and management APIs 1400, a graphical user interface 1410, a system configuration data store 1420, and/or virtual context providers (not depicted). These modules (e.g., systems and/or components) may be combined together to create an architecture for providing context aware adaptation and optimization of services and resources in a distributed computing environment (e.g., the distributed computing environment 100 shown and described in FIG. 1) to achieve prioritized business or computing objectives.

The distributed computing environment 100 may include computer systems, computer networks, software systems, operating systems, web services, databases, virtual and physical servers and networking equipment. The distributed computing environment 100 may include all software and hardware required to run and manage computer systems, computer programs, services, APIs, and processes. The distributed computing environment 100 may also include all software and hardware required to enable communications between services and resources on the same or different virtual or physical servers or networks. Furthermore, the distributed computing environment 100 may also include all software, services, and resources running on the computer systems. The distributed computing environment 100 may be comprised of a combination of one or more computing environments, e.g., a public cloud, a private network or cloud, hybrid systems, or any other network accessible computing environment.

Figure 2:
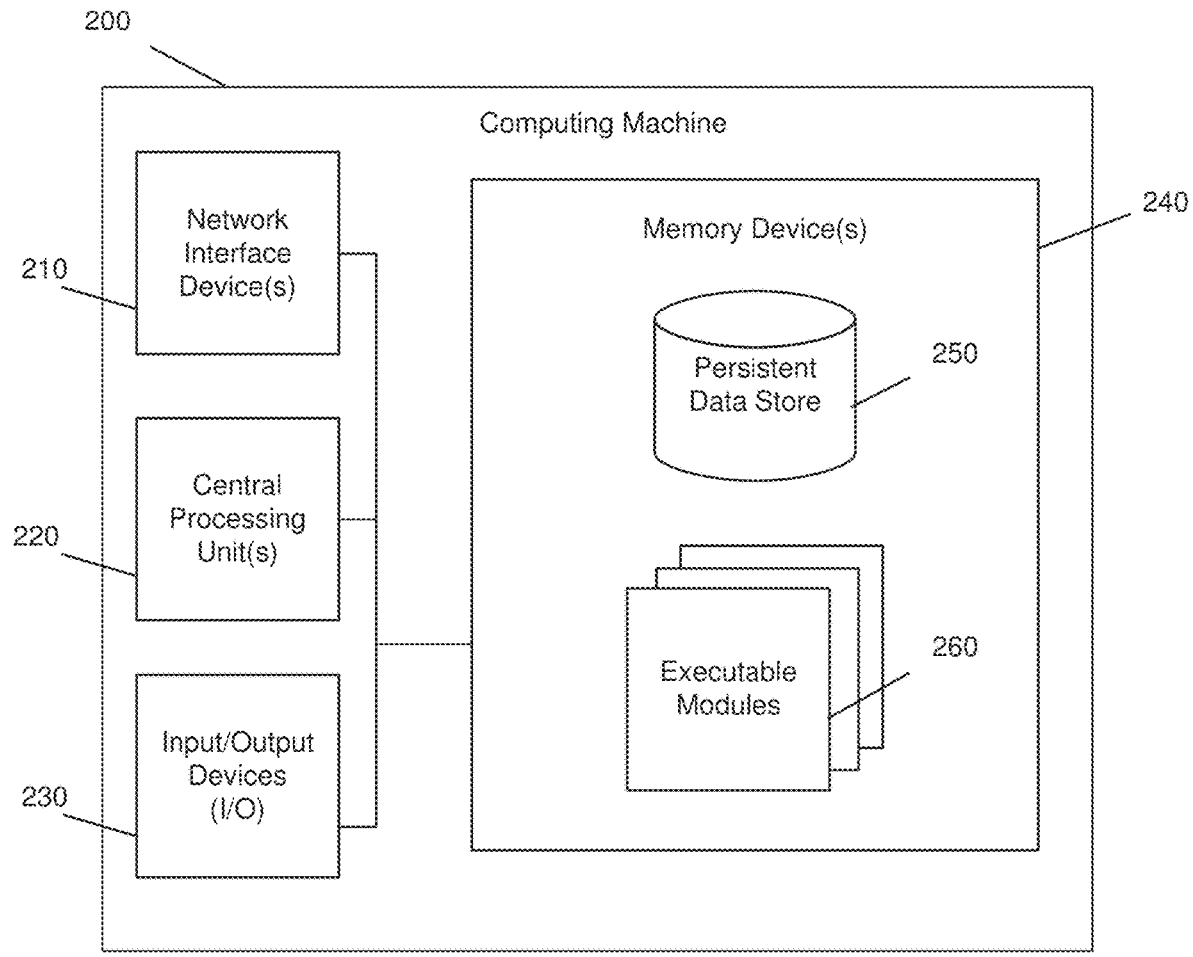
FIG. 2 is a block diagram illustrating an example of a computing machine that may be utilized in the present invention.

Some or all of the components and executable steps of the present invention may be executed on a computing machine 200 (e.g., the computing machine 200 shown and described in FIG. 2). The computing machine 200 may be a physical machine or a virtual machine that executes on a physical machine. The components and executable steps may be implemented as executable modules 260, which may include collections of machine codes selected from the native instruction set of the computing machine 200. The executable modules 260 may be executed by one or more computer processors 220 and may be encoded on a computer-readable storage medium and/or stored in a memory device 240, which may be persistent storage 250. The computing machine 200 may have one or more wired or wireless network interface devices 210 for communicating with other computing machines or devices on the same or different computer networks. The computing machine 200 may be a mobile device, a server, or any other computing machine capable of executing the executable modules 260. The computing machine may have one or more Input/Output (I/O) devices 230 for interacting with the computing machine 200. I/O devices may include one or more touch screens, keyboards, or other known I/O devices.

Figure 3:
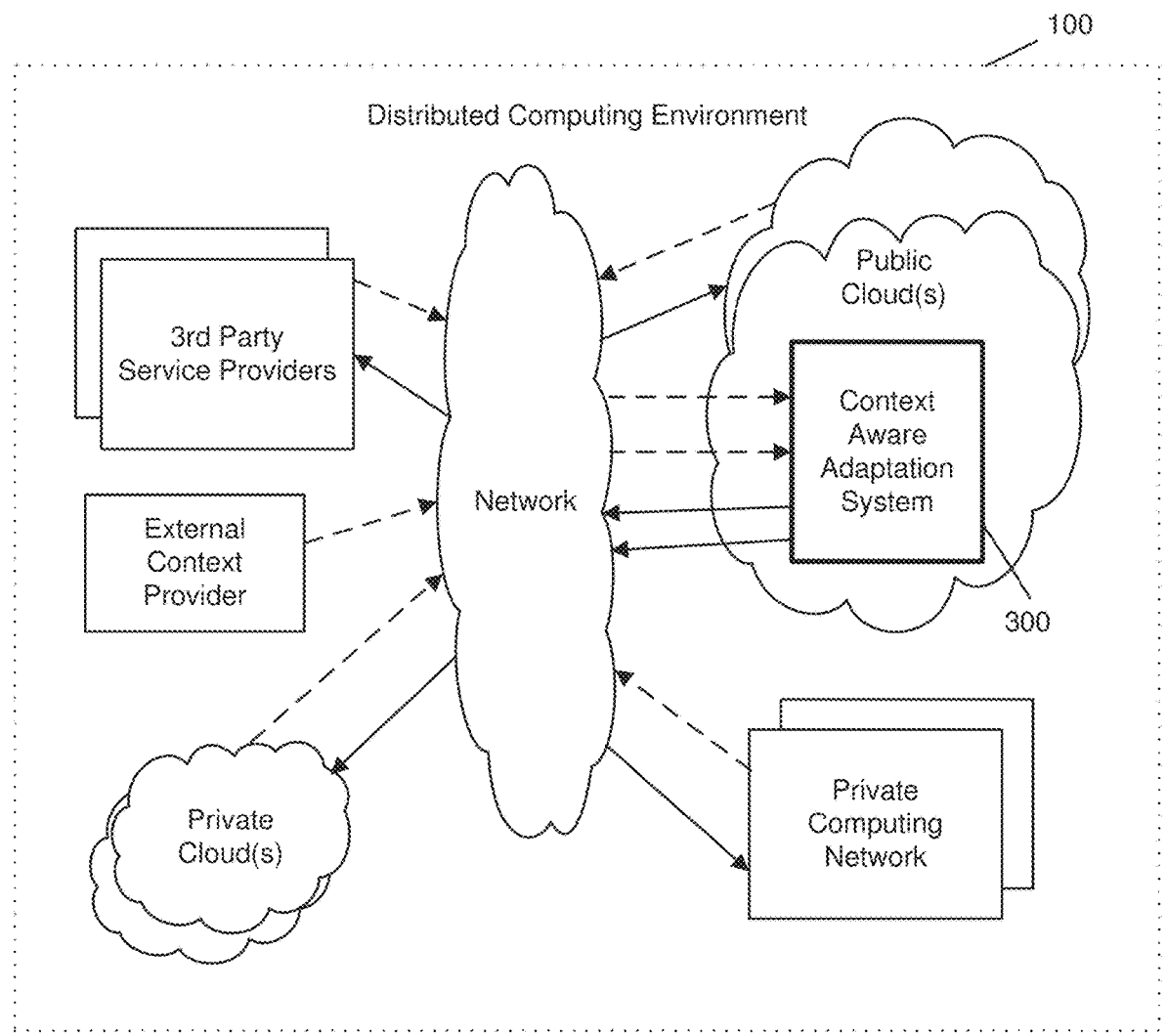
FIG. 3 is a block diagram illustrating an example of context data and adaptation control information flow in a distributed computing environment with respect to the present invention.

The disclosed context aware adaptation system 300, e.g., as shown and described in FIG. 3, may be implemented and may execute within the distributed computing environment 100. The context aware adaptation system 300 may receive context information from various components of the distributed computing environment 100 and may adapt the behavior, operation, and/or performance of services and resources within the distributed computing environment 100. Some or all of the components, resources, and systems of the disclosed invention may communicate with each other, e.g., via application programming interfaces (APIs), which are typically web services but may be other programming interfaces commonly known and used in the art.

Figure 4:
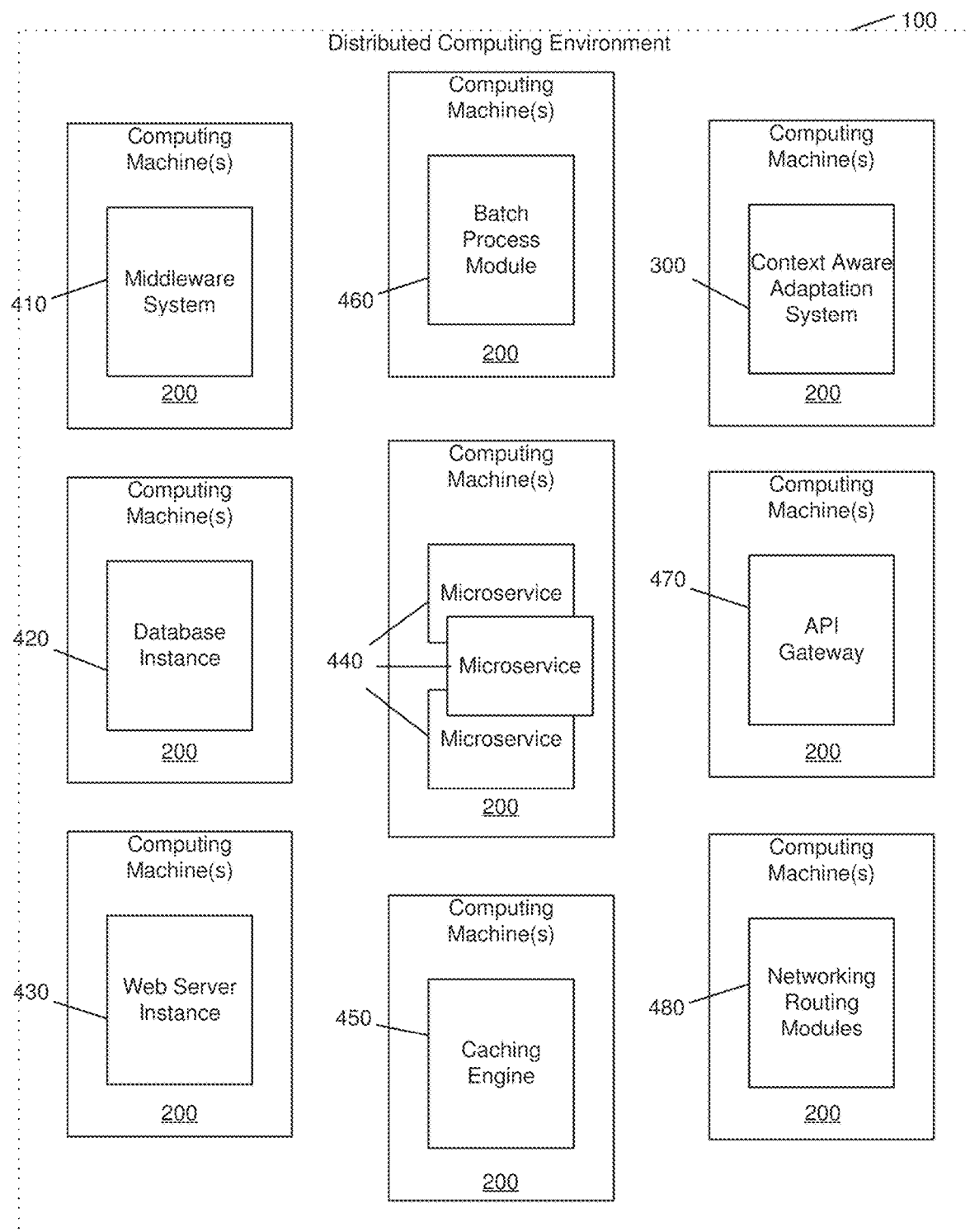
FIG. 4 is a block diagram illustrating an example of a distributed computing environment including different computing machines for executing different services, resources and other components of the present invention.

Some resources that may be adapted and regulated by the present invention are virtual or physical servers, containers, or computing machines 200, middleware systems 410, database servers or instances 420, web server instances 430, micro-services and web services 440, batch processes 460, caching engines 450, API gateways 470, network routing systems 480, or third party products or services, e.g., as shown and described in FIG. 4. Any resource or service within the distributed computing environment 100 that may be manipulated via an API (whether an existing API or a custom developed one) may be adapted and regulated by the present invention.

Figure 5:
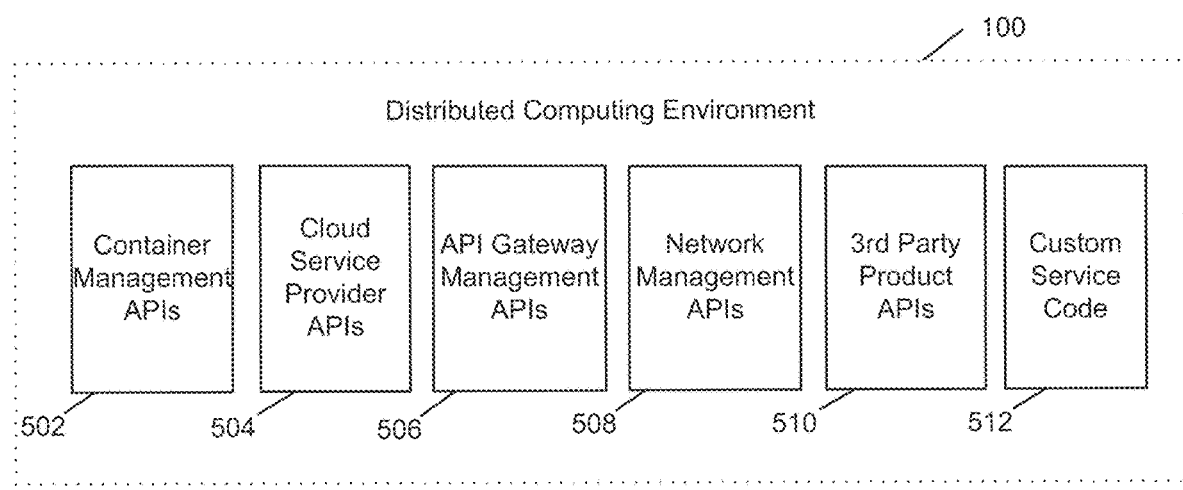
FIG. 5 is a block diagram illustrating an example of a distributed computing environment including existing as well as custom APIs that may be leveraged by the present invention to adapt services and resources in the distributed computing environment.

APIs that may be leveraged by the present invention to adapt resources and services may include, e.g., container management APIs 502, cloud service provider APIs 504, API gateway management APIs 506, network management APIs 508, third party product APIs 510, custom service code APIs 512, e.g., as shown and described in FIG. 5, or any other API that can modulate, regulate, alter, or adapt services or resources. Custom service code may include custom executable code accessible via an API that may directly change the behavior of a running executable service module. Any Software as a Service (SaaS), Infrastructure as a Service (IaaS), and/or Platform as a Service (PaaS) APIs available in the distributed computing environment 100 may also be used by the present invention to adapt and/or regulate resources within the environment.

Figure 6:
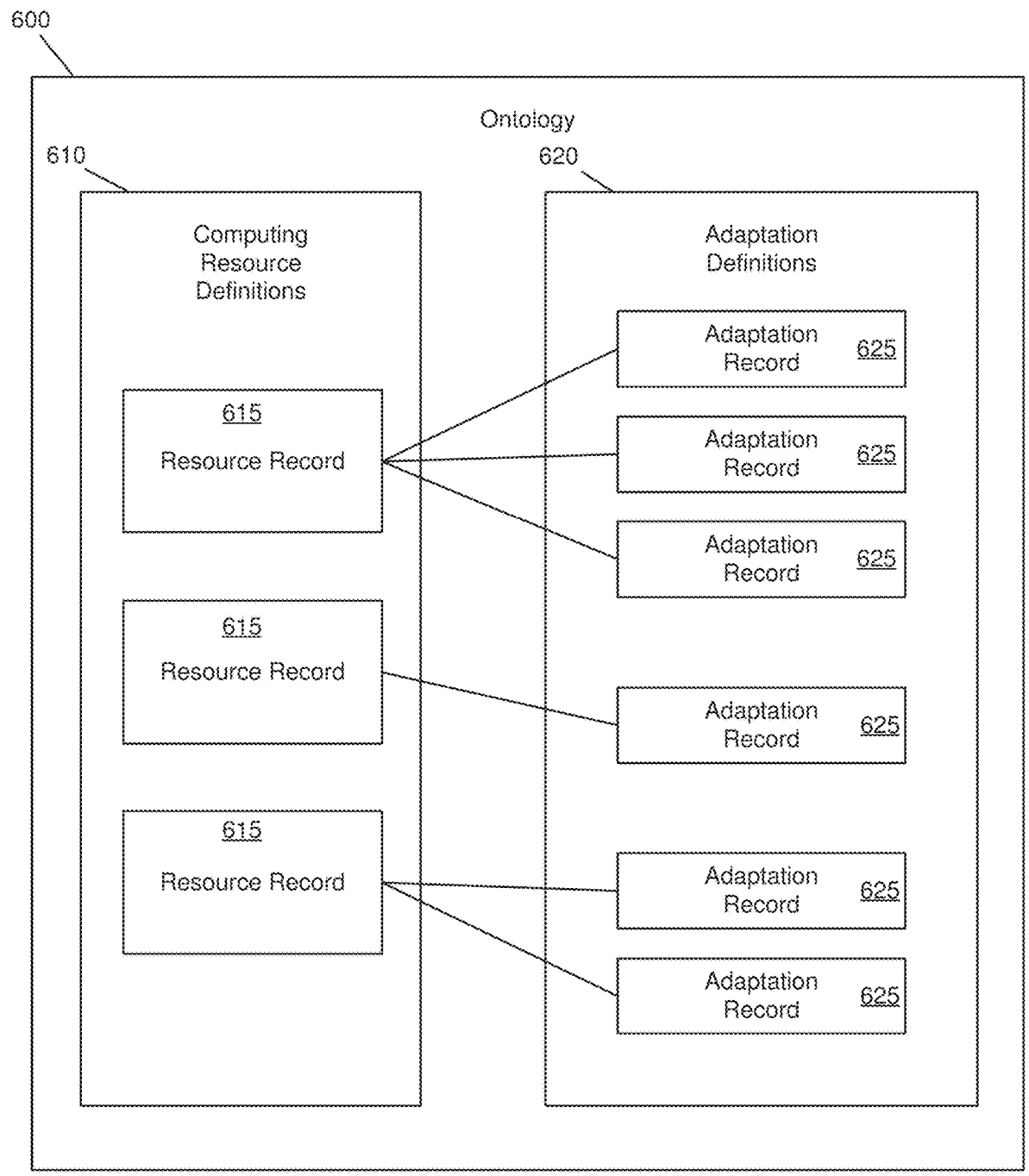
FIG. 6 illustrates a system for defining, storing, and managing an ontology of services and resources in a distributed computing environment according to an example of the present invention.

An ontology 600 (e.g., as shown and described in FIG. 6) of the resources and services that make up the distributed computing environment 100 may be defined and managed. The ontology 600 may include computing resource definitions 610. The computing resource definitions 610 may be comprised of resource records 615, which represent a resource or service within the distributed computing environment 100. A resource record 615 may represent a web service, a database instance, a cache engine, an API proxy, or any other resource in the distributed computing environment 100.

The ontology 600 may also include adaptation definitions 620. The adaptation definitions 620 may include one or more adaptation records 625. An adaptation record 625 represents a specific action that may adapt or alter behavior or performance of a specific resource in some way. One or more adaptation records 625 may be associated with a resource record 615. Furthermore, an adaptation record 625 may be associated with one or more resource records 615. Adaptation records 625 that are associated to a resource record 615 may be defined as being independent of one another, or they may be defined as being mutually exclusive, or they may be dependent on one another in terms of their sequence of execution. For example, an adaptation record 625 representing the scaling up of a micro-service may be defined as mutually exclusive of another adaptation record 625 that represents the scaling down of a micro-service. It may be desirable that these adaptations never be done together. Adaptation records 625 may also define minimum or maximum limits for one or more aspects of the resource. For example, a micro-service may define a minimum and/or maximum number of runtime instances that can be deployed and executing at any given time. A resource record 615 representing an API proxy may define minimum and/or maximum transactions per second (TPS) that may restrict how much that API proxy may be throttled up or down. Adaptations may also define frequency limits that determine how often an adaptation may be applied to a resource. Adaptations may also define duration limits that would determine a period of time after which the adaptation should expire and be reversed or rolled back. An adaptation record 625 may also contain API access information, which may include a location and/or address of the API within the distributed computing environment 100, account information, credentials, and/or any other information necessary to access and invoke the API.

An adaptation record 625 may define a cost function that may levy a cost or penalty for executing the adaptation. The cost may be static or it may be calculated based on contextual information from the distributed computing environment 100 and the current state of the resource that is being adapted. The static or calculated cost may be positive or negative. Furthermore, if desired, an adaptation record 625 may be defined with no cost function or a zero-cost function. The present invention may include services and APIs for defining, configuring, querying, and otherwise managing computing resource definitions 610 and adaptation definitions 620.

Figure 7:
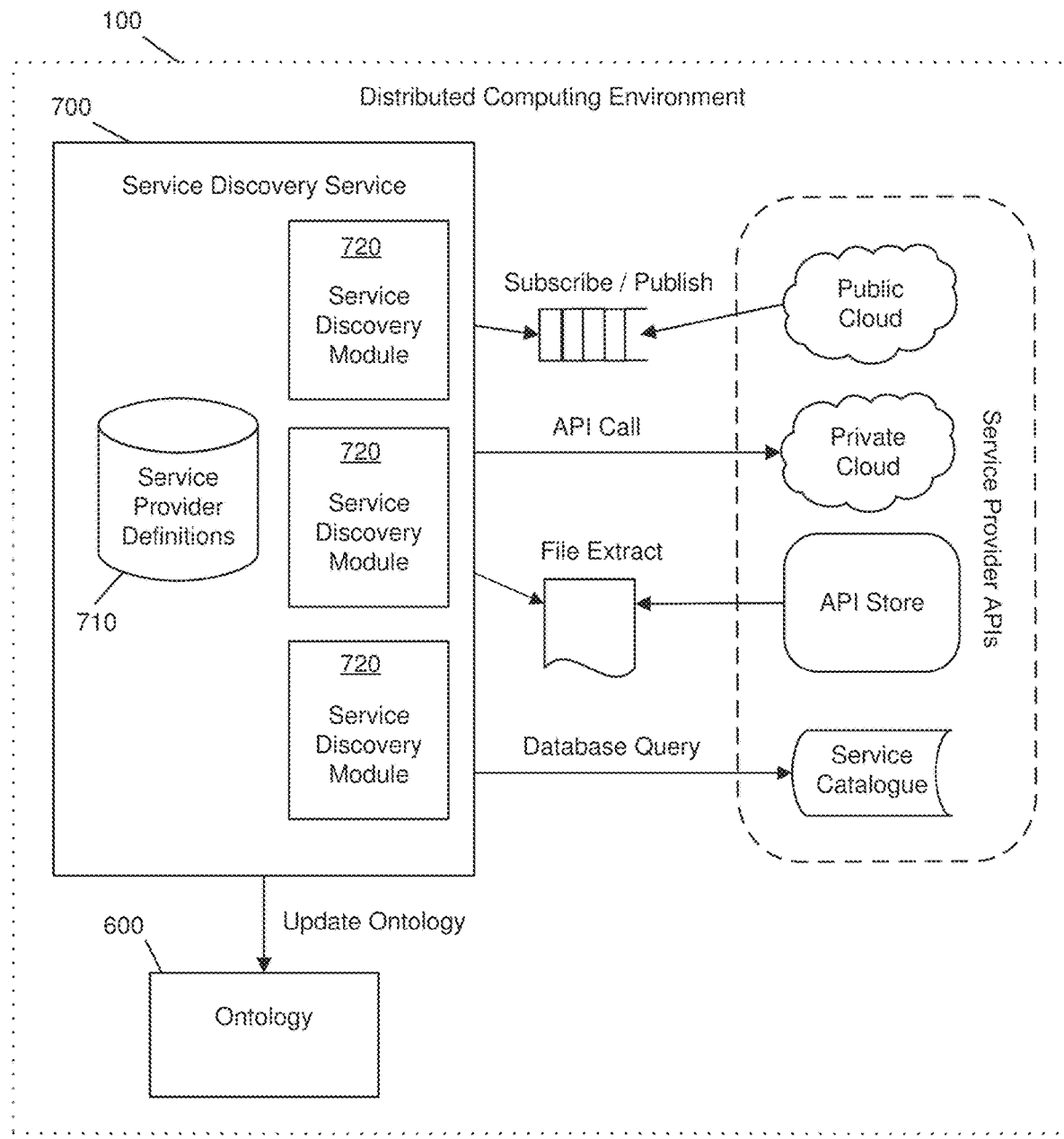
FIG. 7 illustrates a system for managing an ontology of a distributed computing environment by automatically discovering services and resources and available actions to adapt and regulate the services and resources according to an example of the present invention.

The service discovery service 700 (e.g., as shown and described in FIG. 7) may automatically define, configure, and manage computing resource definitions 610 and/or adaptation definitions 620 in the ontology 600. The service discovery service 700 may create, update, or delete resource records 615 and/or adaptation records 625 including some or all of the attributes of the records. Resource records 615 and adaptation records 625 may be managed completely with, completely without, or partially with the service discovery service 700. The service discovery service 700 may include service provider definitions 710 that may define the service providers that should be programmatically explored for services and resources to be added to the ontology 600. Service providers may include cloud service providers, API management services, container management systems, middleware systems, service catalogues and registries, API stores, IaaS, PaaS, and SaaS providers, or any other system that may provide information about resources deployed and executing in a distributed computing environment 100. The service provider definitions 710 may include account information, URIs or other connection information, credentials, resource restrictions or exclusions if applicable, and any other information necessary for service discovery. Resource restrictions may be defined in a service provider definition 710 to indicate services and/or adaptation actions that should be excluded from the ontology 600.

The service discovery service 700 may include service discovery modules 720 that may use information from the service provider definitions 710 to connect to a service provider and attempt to discover available resources, services, and adaptation actions available to adapt the resources and services. A service discovery module 720 may utilize API calls to connect to a service provider and query for available resources and adaptive actions. Alternatively, a service discovery module 720 may subscribe to a pub/sub messaging service to be notified of new services and resources or changes to existing ones. A service discovery module 720 may also discover service information by querying a service catalog database directly or by consuming an extract file containing service information. Once a service discovery module 720 has discovered new or changed services and/or adaptive actions using one of these or other service discovery methods, it may insert, update, or delete resource records 615 and/or adaptation definitions 625.

For example, a service discovery module 720 may utilize a service provider definition 710 to make web service API calls to connect to a cloud service provider. The service discovery module 720 may use APIs provided by the cloud service provider to obtain a list of services and/or resources deployed and running in one or more accounts as defined in the service provider definition 710. The resources may include databases, virtual servers, containers, load balancers, API proxies, cache engines, serverless processes, network zones and routes, file systems, queues, web servers, messaging endpoints, and various other computing resources. The service discovery module 720 may update the ontology 600 with the discovered resources. Given a specific service provider and the type of each resource, the service discovery module 720 may automatically update the ontology 600 with known adaptation definitions 620 for the discovered resources. Alternatively, the service discovery module 720 may make additional API calls to the service provider to discover what adaptation actions are available for a discovered resource.

Figure 8A:
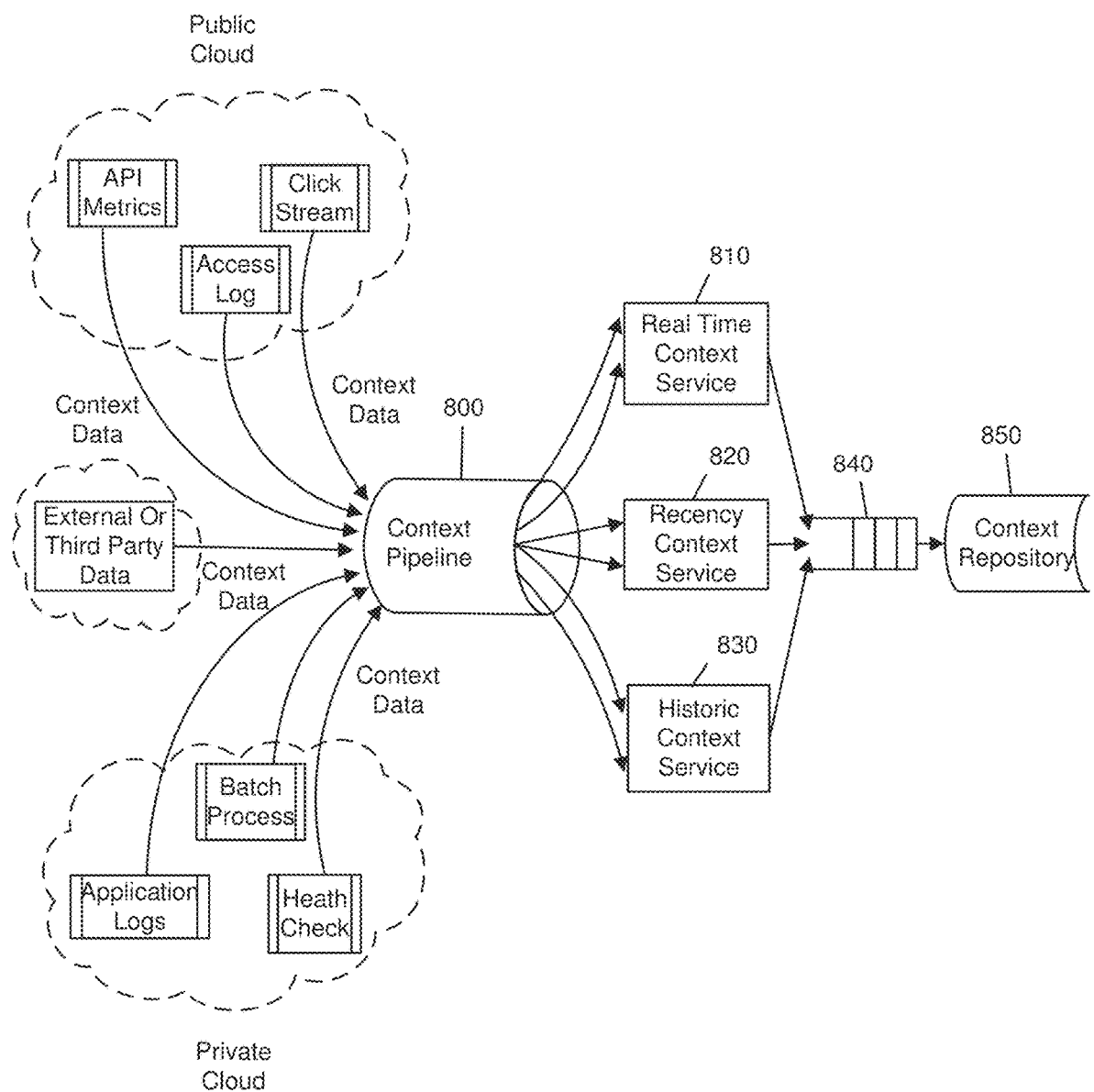
FIG. 8A illustrates a system for collecting, processing, and storing context data in a distributed computing environment according to an example of the present invention.

A context pipeline 800 (e.g., as shown and described in FIG. 8A) may aggregate and share context data to be processed, stored, and consumed by the present invention. The context pipeline 800 may be implemented as a distributed data streaming service or similar invention that allows data producers to publish data and data consumers to subscribe to data independently of one another. The data pipeline 800 may accept context data from producers across the distributed computing environment 100. Context data may be streamed or may be sent in a batch mode. Examples of context data may include click streams, http access logs, API metrics, service response times, application logs, error or exception logs, server logs, network traffic metrics, application and service health checks, deployment events for containers or virtual servers or micro services, real time or batch transaction data, active login sessions, web traffic, mobile traffic, number of processes or threads being used by a service, latency of requests, queue depth, network or file system or memory or processor utilization, or any other data that can provide information on the state of the distributed computing environment 100 or individual resources.

Figure 8B:
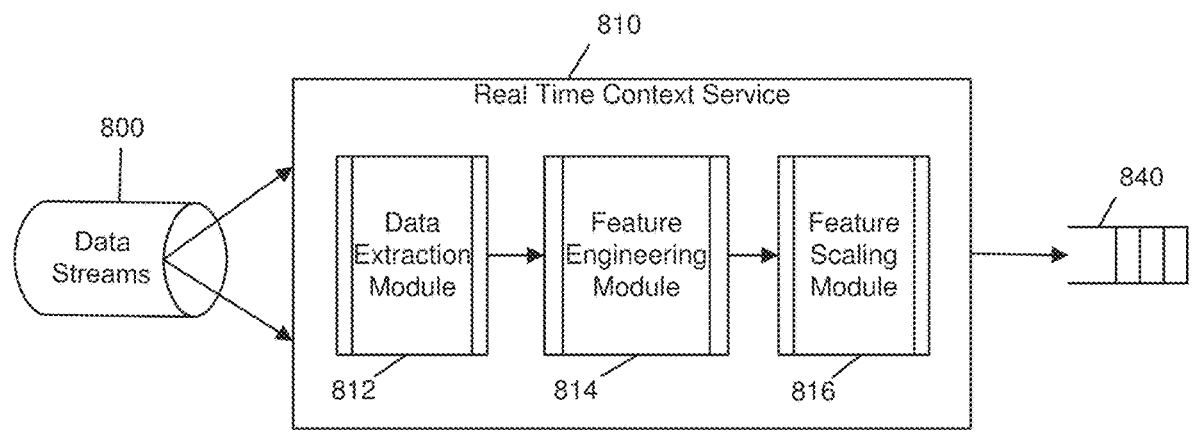
FIG. 8B illustrates a system for processing real time context data in a distributed computing environment according to an example of the present invention.

Context data that are received by the context pipeline 800 may be processed by a context service. Some context data may be processed by a real time context service 810 (e.g., as shown and described in FIG. 8B). A real time context service 810 may process streaming data so that each data event will be processed immediately when it becomes available. A real time context service 810 may include the following executable modules. A data extraction module 812 may extract some or all data from each data event consumed from the data pipeline 800. A feature engineering module 814 may transform the context data into one or more data features as may be required for statistical analysis and machine learning algorithms. A feature engineering module 814 may perform one or more of the following operations: feature extraction, feature selection, transformation, and dimensionality reduction. A feature scaling module 816 may further scale the feature(s) to enable better analysis and training performance.

Figure 8C:
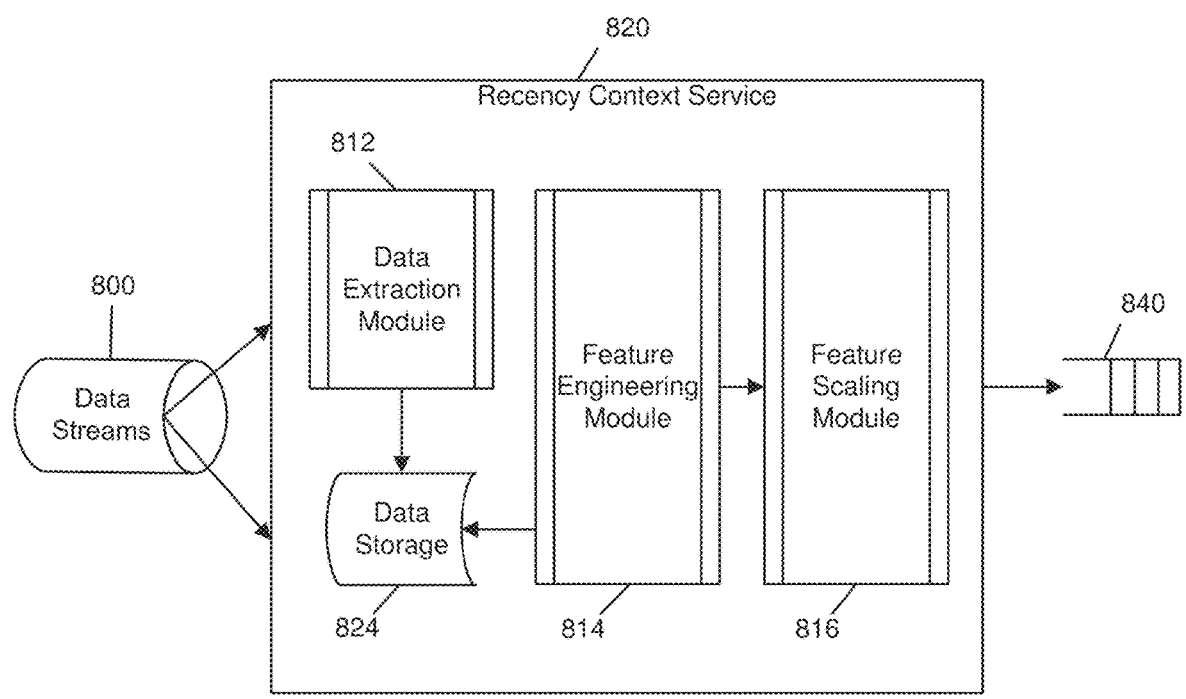
FIG. 8C illustrates a system for processing recent context data in a distributed computing environment according to an example of the present invention.

Other context data may be processed as a summary of recent events by a recency context service 820 (e.g., as shown and described in FIG. 8C). A recency context service 820 may contain a data extraction module 812 that consumes context events from a streaming data producer, extracts data from the event, and/or stores those data in a data store. A recency context service 820 may also contain a feature engineering module 814 that will summarize and transform the aggregated context data stored in the data store into one or more features. A feature engineering module 814 included in the recency context service 820 may recursively transform accumulated context data into features based on a defined interval of time or based on a defined threshold of context events. A feature engineering module 814 may perform one or more of the following operations: feature extraction, feature selection, transformation, and dimensionality reduction. A recency context service 820 may also contain a feature scaling module 816 which may further scale the feature(s). For example, if a context data event represents a user logging into a web application, instead of creating a feature whose value represents every user login event, it may be desirable to create a feature that represents the number of users who have logged-in in the last five minutes. Optionally it may be desirable to create a feature that represents that the number of logged-in users has increased or decreased by a defined amount.

Figure 8D:
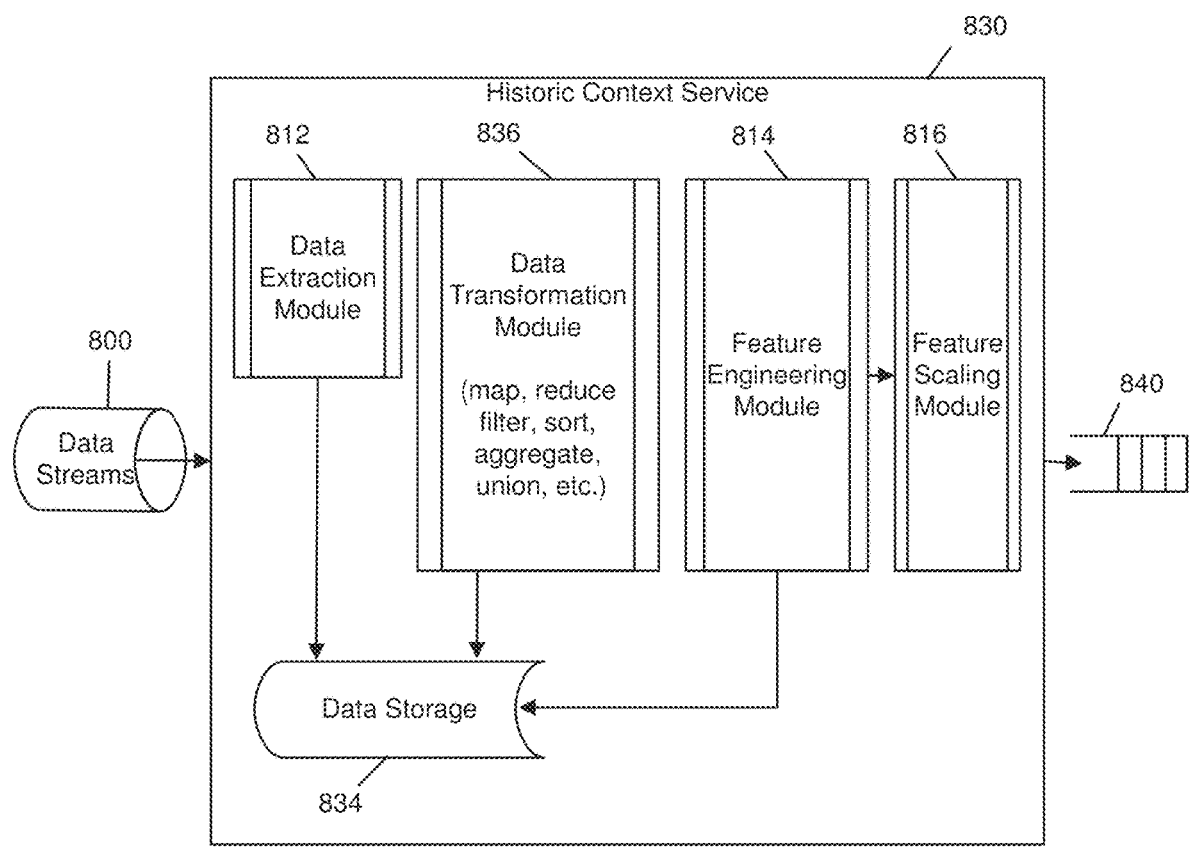
FIG. 8D illustrates a system for processing historic context data in a distributed computing environment according to an example of the present invention.

Some context data producers may provide data as a batch file or in some other batch format to the context pipeline 800. Batch data may be processed by an historic context service 830. The historic context service 830 (e.g., as shown and described in FIG. 8D) may contain a data extraction module 812 that consumes batch context data and/or extracts and stores it into an historic context data store 834. The historic context service 830 may also contain one or more data transformation modules 836 that may transform the data using one or more of the following data transformation operations: map, reduce, filter, union, join, split, sort, aggregate, and/or any other data transformation operation. The one or more data transformation modules 836 may store the results of the transformations in the historic context data store 834. The historic context service 830 may also contain a feature engineering module 814 that may summarize and operate on the transformed data stored in the historic context data store 834 to generate one or more features. The feature engineering module 814 may perform one or more of the following operations: feature extraction, feature selection, transformation, and/or dimensionality reduction. The historic context service 830 may also contain a feature scaling module 816, which may further scale the feature(s).

Features that have been extracted by the realtime context service 810, the recency context service 820, or the historic context service 830 may be placed on the context subscription queue 840. A context event subscriber may consume context events from the context subscription queue 840 and store the features in the context repository data store 850.

Figure 9:
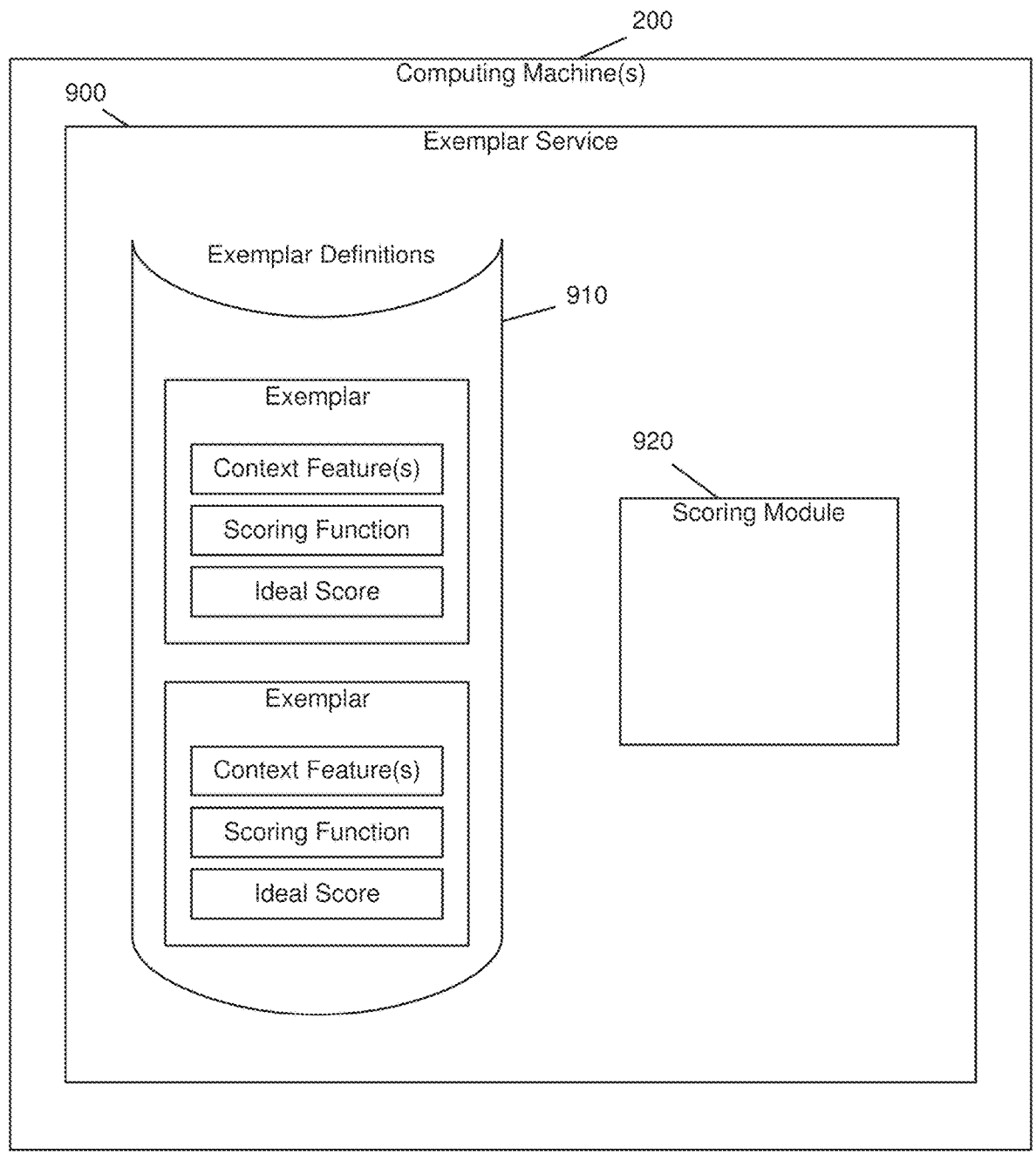
FIG. 9 illustrates a system for defining, storing, managing, and scoring exemplars based on available context data in a distributed computing environment according to an example of the present invention.

FIG. 9 illustrates an exemplar service 900 for defining, storing, managing, and scoring exemplars, according to an illustrative embodiment of the invention. An exemplar service 900 may contain an exemplar definitions data store 910 and a scoring module 920. An exemplar may be defined as a representation of the ideal, best possible, exemplary operation, performance, and/or execution of a computer-implemented business or computational process that executes in the distributed computing environment 100. The process that an exemplar represents may be implemented using one or more services, resources, components, systems, and or subsystems within the distributed computing environment 100 to achieve a desired outcome.

For example, considering an e-commerce platform, an exemplar may be created to represent the process of a customer entering and saving a preferred credit card. This process may require the collaboration of multiple systems and services for input validation, credit card verification, encryption, data storage, preference management, authentication and authorization, to name a few. The exemplar may be defined in terms of the desired outcome or value created by the process instead of the executable steps themselves. The exemplar may represent the ideal execution of this end-to-end process without specifically identifying or referencing the resources and systems that may have collaborated to achieve the outcome.

Exemplars may be defined in terms of context features that have been obtained from the distributed computing environment 100. Exemplars are defined and stored in the exemplar definitions data store 910. One or more context features that may indicate the successful operation of the represented process are associated with the exemplar. Associated context features may represent, for example, health checks, throughput, cycle time, and/or application log messages. Features may be combined and/or weighted as appropriate based on their significance and/or criticality to the end to end process.

Exemplars may be assigned a score factor (or weight) that represents the relative importance of the represented process relative to all other exemplars. A scoring function may also be defined and associated to each exemplar. The scoring module 920 may perform scoring calculations to determine the exemplar's score. The scoring module 920 may use the scoring function to evaluate the associated context feature(s) to calculate the score of the exemplar at any given time. When the context feature(s) reflect ideal operation and execution of the represented process, the scoring module 920 may calculate an ideal score. The calculated score may be discrete or continuous. Scoring functions may also implement time-based penalty functions such that an exemplar's score that is less than ideal may change over time. This capability may allow an exemplar to represent a process that can tolerate less than ideal operation for a short period of time. For such an exemplar, the calculated score may continue to decrease relative to the duration that the process has not been operating at an acceptable level. For example, if context feature(s) indicate that a process represented by an exemplar is not operating optimally, the scoring function may calculate a score less than the ideal score. If the represented process continues at the same level of operational performance, the calculated score may fall over time. The relationship with time may be linear or non linear. An exemplar may define time and/or score thresholds at which the calculated score may cease to be affected by the passing of time. An exemplar may optionally define a threshold score below which the calculated score must fall before adaptation actions are taken to improve the exemplar score.

The score for an exemplar will be calculated by weighting the features that represent the exemplar. The specific set of features (including any normalization, standardization, or transpositions) along with their weights will constitute the scoring function or model. The exemplar score will return the probability (0≤score≤1) that the exemplar is operating optimally or at an ideal score. Below is a sample formula for an exemplar score:

$$\text{score} = P(Y=1) = \frac{1}{1+e^{-(\beta_0+\beta_1 x_1+\beta_2 x_2 \ldots \beta_p x_p)}}$$

Below is an alternative linear representation:

$$\log\left(\frac{P(Y=1)}{1-P(Y=1)}\right) = \beta_0 + \beta_1 X_1 + \beta_2 X_2 + \ldots + \beta_p X_p$$

The features are represented by $X_1$, $X_2$ through X for a quantity of p features. $\beta_0$ is the value the linear expression will take when all feature values $X_1$, $X_2$ through X are zero. $\beta_1$, $\beta_2$ through $\beta_p$ are coefficients (or weights) of the respective features $X_1$, $X_2$ through $X_p$. Y is a context measurement (feature or an interaction of features) that signifies how well the exemplar is performing.

The scoring function will return a value between 0 and 1 indicating the performance of the exemplar. A value of 1 indicates perfect or ideal functioning/performance and 0 indicates the worst performance. The threshold used to determine what is acceptable performance and at what score adaptations should be initiated can be defined independently for each exemplar.

Creating a scoring function for a specific exemplar will involve identifying the specific feature set and the β coefficients for each feature. This can be accomplished using a learning service 1000 using data from multiple supervised examples to minimize a cost function with respect to Y and choosing the model that performs best on unseen data. This feature set may be reduced from all context events using one or more feature reduction techniques, e.g., principal component analysis (PCA). Alternatively, features may be selected by an expert in the domain of the exemplar. Below is a sample cost function to select appropriate coefficients for a feature set:

$$\underset{\beta_0,\beta_1,\ldots,\beta_p}{\text{argmin}}\left[-\sum_{i=1}^{n}(y_i\ln(p_i)+(1-y_i)\ln(1-p_i))+\lambda\sum_{i=1}^{n}\beta_j^2\right]$$

In some embodiments, the cost function includes an L1 or L2 regularization hyper-parameter π that helps shrink coefficients toward zero for better performance and accuracy.

The cost function above represents a possible implementation for optimizing and scoring an individual exemplar. The present invention may simultaneously solve multiple exemplar objectives by maximizing the sum of all exemplar scores multiplied by their respective score factors. For example, let each exemplar's score factor be represented by $X_1$ to $X_n$ for n exemplars. Let $\beta_i$ to $\beta_n$ represent each exemplar score for n exemplars. The optimization of all exemplars simultaneously may then be determined according to the following:

$$\underset{\beta_i \ldots \beta_n}{\text{argmax}}\left[\sum_{i=1}^{n}\beta_i X_i\right]$$

-continued $\cdot i$ = optimized sigmoid score $X_i$ = exemplar score factor

In this example, exemplars with higher score factors account more toward the overall optimization objective. The result is that if tradeoffs must be made based on resource contention or competing objectives between exemplars, the ones with higher score factors will receive preferential treatment.

Figure 10A:
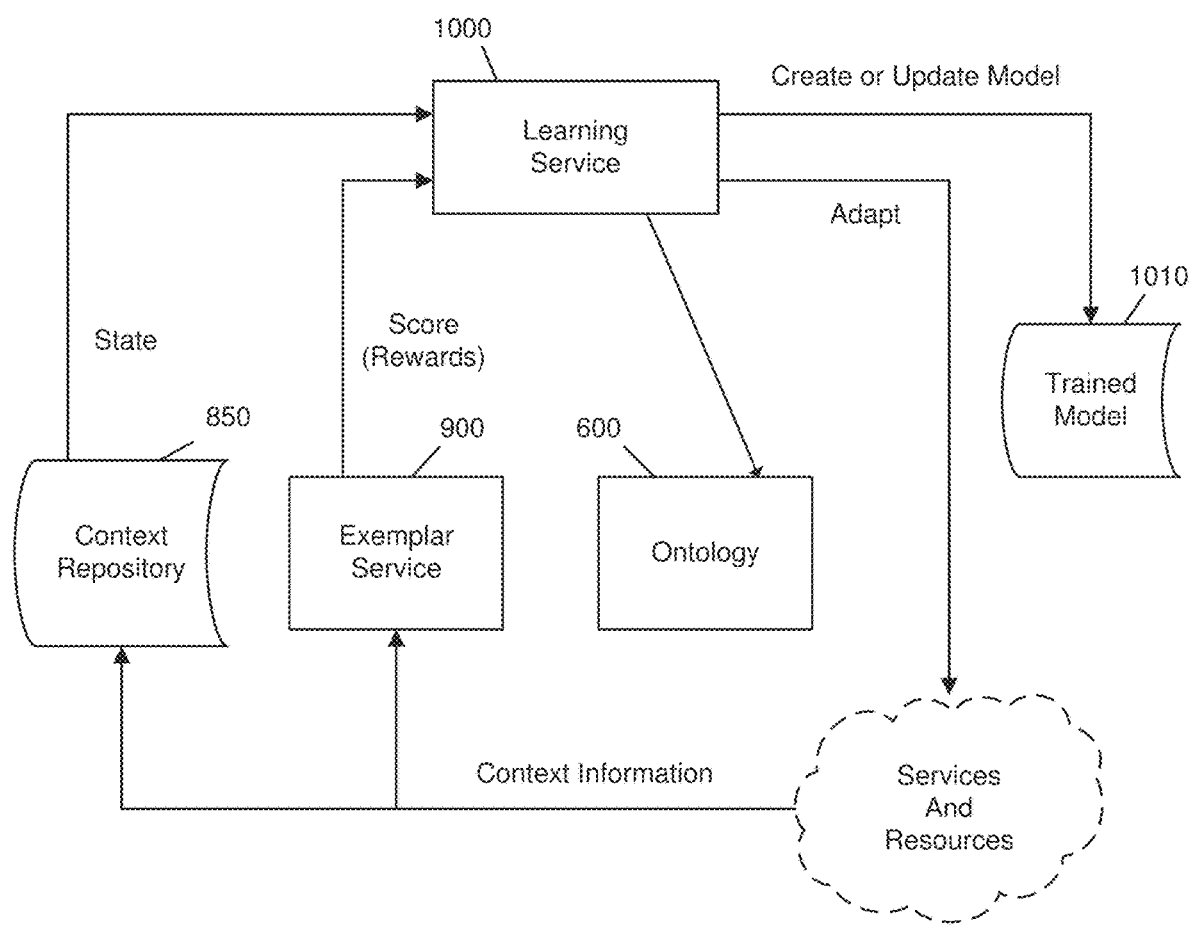
FIG. 10A illustrates a system for generating and updating a trained model to adapt services in a distributed computing environment according to an example of the present invention.

FIG. 10A illustrates a learning service 1000 for generating and updating a trained model 1010. The learning service 1000 may use individually or concurrently one or more learning modes such as supervised, unsupervised, reinforcement learning, or any combination of these or others commonly known and used in data science and machine learning. The learning service 1000 may have one or more executable learning modules that may execute statistical and/or machine learning algorithms to learn the relationships between context states, adaptation actions, and exemplar scores. Specifically, the learning service 1000 may make adaptations to services and resources based on resource records 615 and adaptation records 625 defined in the ontology 600. The learning service 1000 may receive feedback in the form of context features received via the context pipeline 800 and stored in the context repository 850. The learning service 1000 may also evaluate the effect of the adaptations on exemplars by receiving calculated scores from the exemplar service 900. In determining what adaptations result in the highest exemplar scores for given context states, the learning service 1000 may also consider penalties levied by cost functions defined for adaptation records 625.

The learning service 1000 may continue a cycle of making adaptations and evaluating the effects of such adaptations until it learns what adaptations result in the highest exemplar scores for given context states of the distributed computing environment 100. The result and output of this training is a trained model 1010, which may evolve over time and become iteratively better defined as more adaptations are performed and their effects evaluated. The learning service 1000 may operate in a production environment or in a similarly configured non-production environment. In the latter case, the trained model 1010 may be transferred and imported into a production environment for runtime execution and adaptation recommendations. Given a context state, the trained model 1010 may make adaptation recommendations reactively or proactively to improve or maintain the highest attainable exemplar scores. The highest attainable exemplar scores may be below the ideal scores depending on the current state of the distributed computing environment 100. The learning service 1000 may also leverage supervised learning by being provided examples of adaptations and the effects that they have on exemplar scores. The learning service 1000 may also leverage unsupervised learning by observing changes that may occur in the context repository and any corresponding changes that may occur to calculated exemplar scores.

The learning service 1000 will receive for the current time t the current state $s_t$ from the context repository and a reward $r_t$ from the exemplar service 900. The set of all possible actions a will include the defined adaptation actions 620. After initiating an action via the adaptive behavior service 1200, the learning service 1000 will receive the next state $s_{t+1}$ and reward $r_{t+1}$. After being trained, the learning service 1000 will produce an optimal policy π* that will map the best estimated action a to each state s to achieve the highest reward r. The learning service 1000 can produce an optimal policy π* via many different algorithms. One example is a gradient based policy algorithm, e.g.:

$$\nabla_\theta J(\theta) \approx \sum_{t \geq 0} (Q^{\pi_\theta}(s_t, a_t) - V^{\pi_\theta}(s_t))\nabla_\theta \log \pi_\theta(a_t|s_t)$$

Figure 10B:
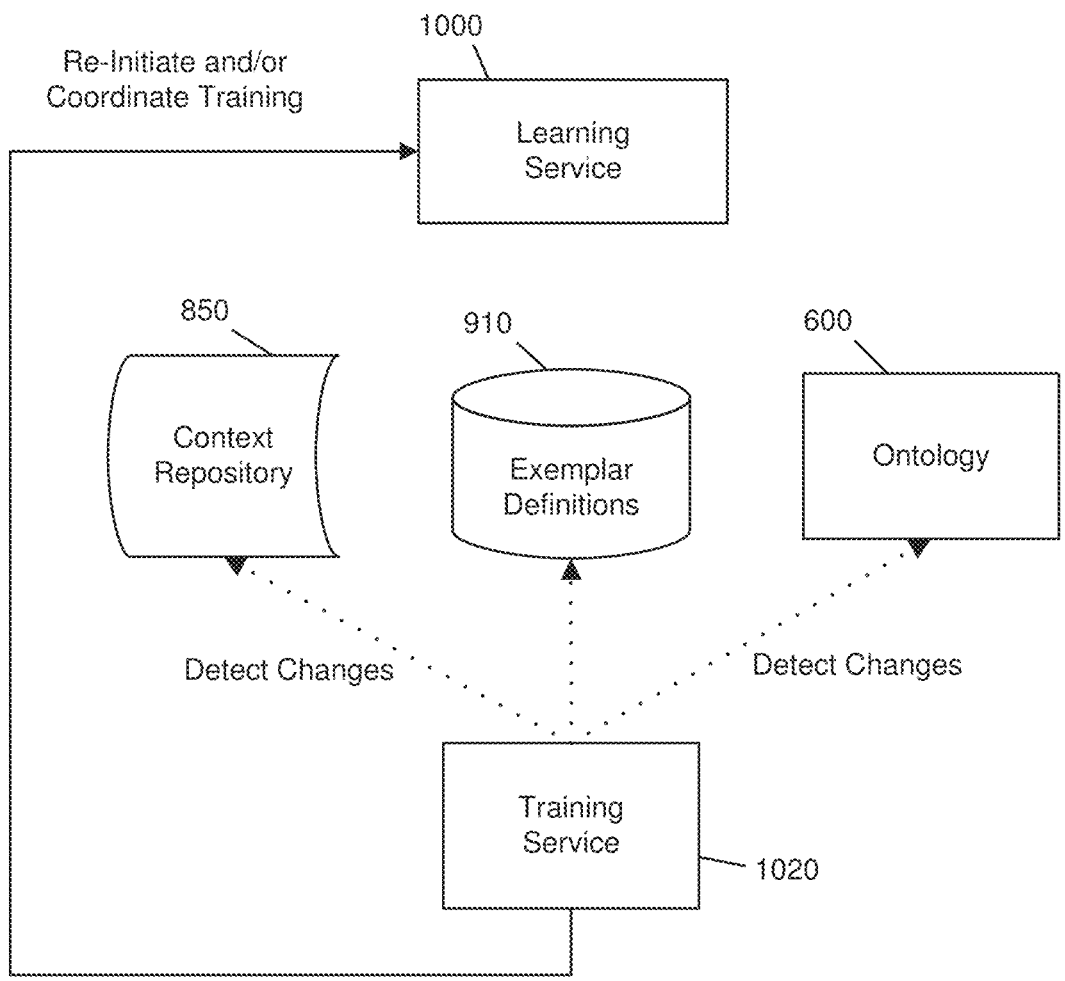
FIG. 10B illustrates a system for generating and updating a trained model using a training service to adapt services in a distributed computing environment according to an additional example of the present invention.

FIG. 10B illustrates a training service 1020, which may contain one or more executable modules for facilitating training activities to optimize learning and reduce training time. The training service 1020 may also manage execution activities and transitions from supervised learning, unsupervised learning and reinforcement learning, to online learning. The training service 1020 may also coordinate and orchestrate various combinations of learning algorithms sequentially and/or in parallel. The training service 1020 may also detect changes made to the context repository 850, exemplar definitions 910, ontology 600, or other aspects of the present invention or the distributed computing environment 100 and initiate and facilitate additional training when warranted.

Figure 10C:
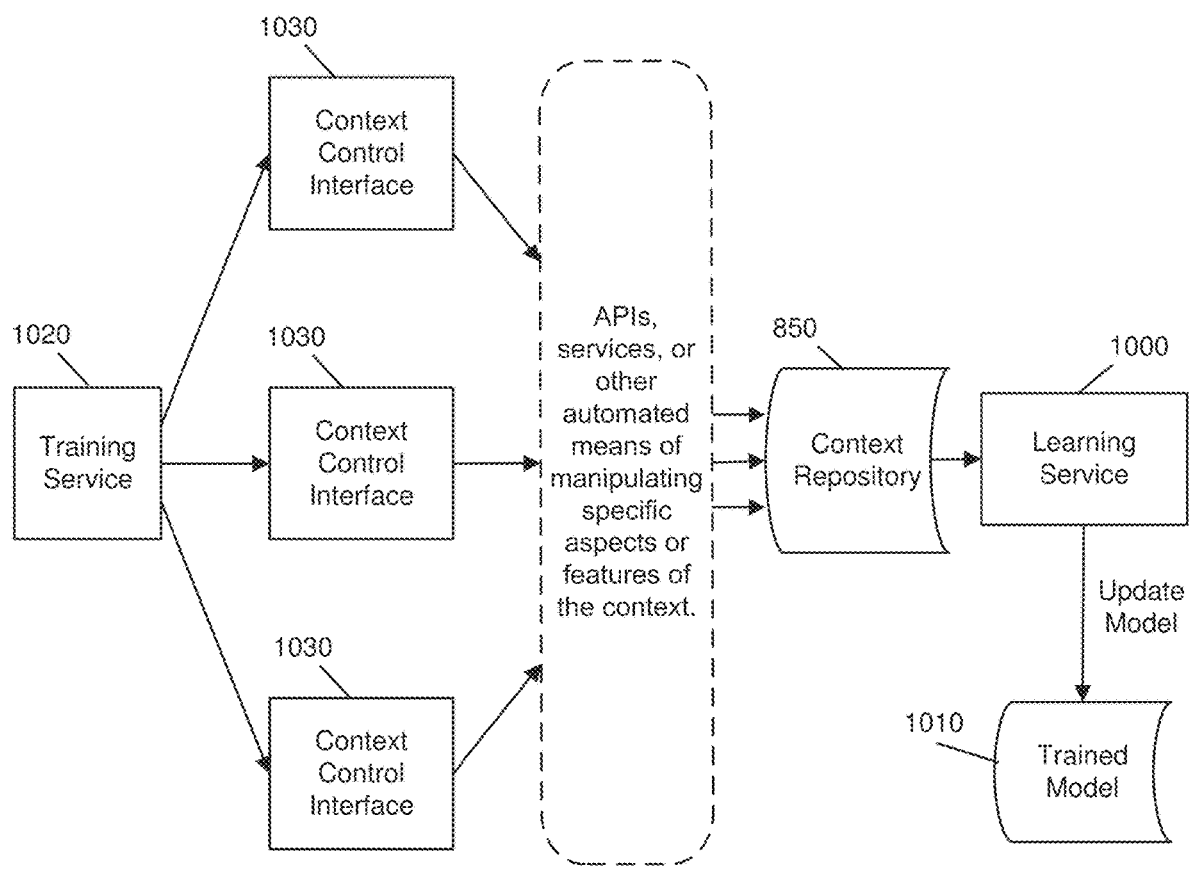
FIG. 10C illustrates a system for randomizing context data to improve the quality of the trained model and to reduce the required training time according to an additional example of the present invention.
Figure 11:
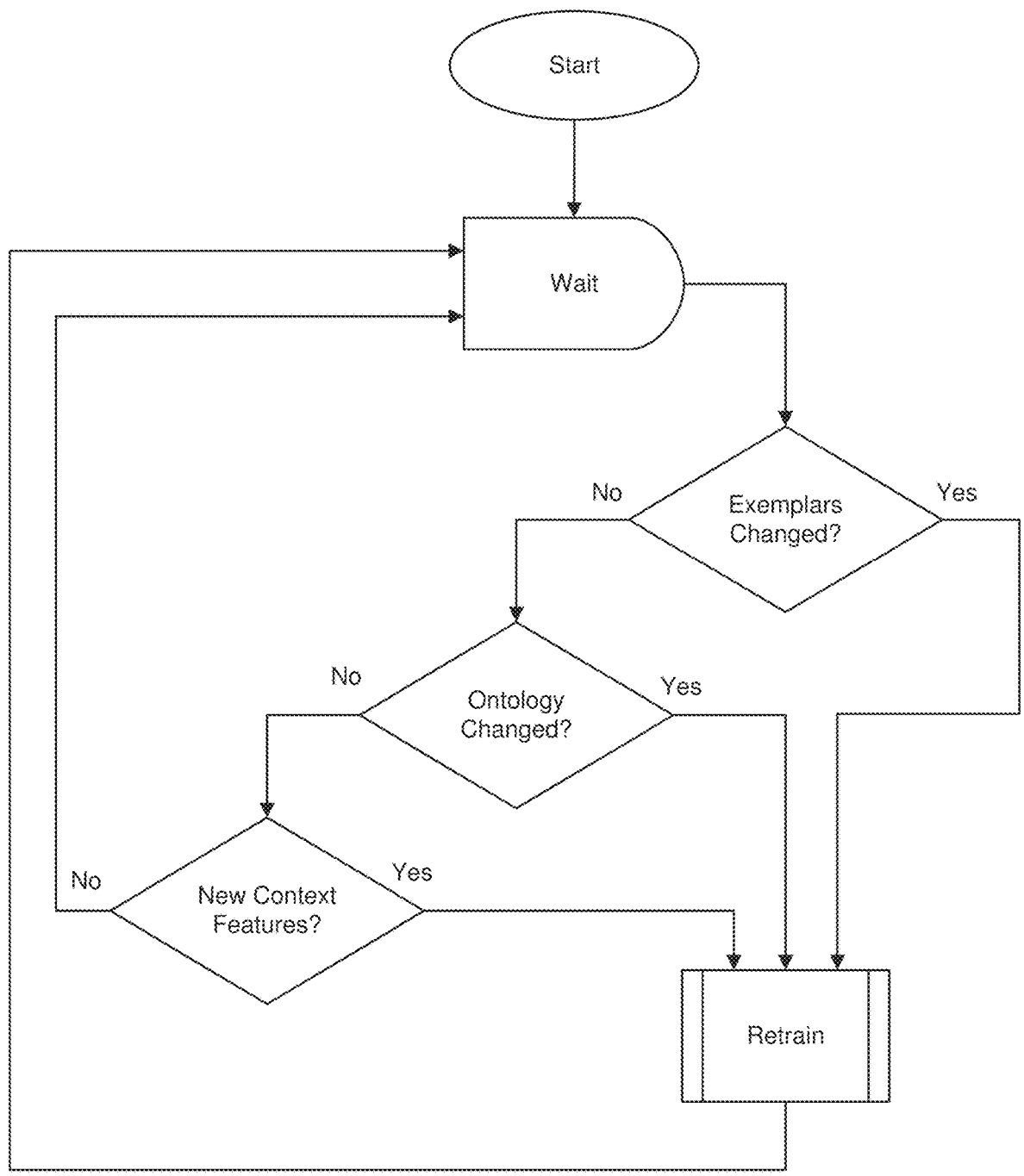
FIG. 11 is a flowchart of an example method for automatically initiating additional training and refinement of a trained model according to an example of the present invention.

FIG. 10C illustrates a training service 1020 calling one or more context control interfaces 1030 to generate additional context states for the learning service 1000. Context control interfaces 1030 may contain executable modules that may communicate via API calls with various services and resources in the environment 100. The intent of these API calls is to change the state of the distributed computing environment 100 in some way and have the changed state be reflected in the context repository 850. For example, a context control interface 1030 may shut down a service to cause errors or failures or change a timeout value or introduce latency into a call chain. As another example, a context control interface 1030 may initiate automated scripts to simulate high volumes and/or high concurrency of transactions. The resulting context states may provide additional data samples for the learning agent and may reduce training time and/or result in an improved trained model 1010.

Figure 12A:
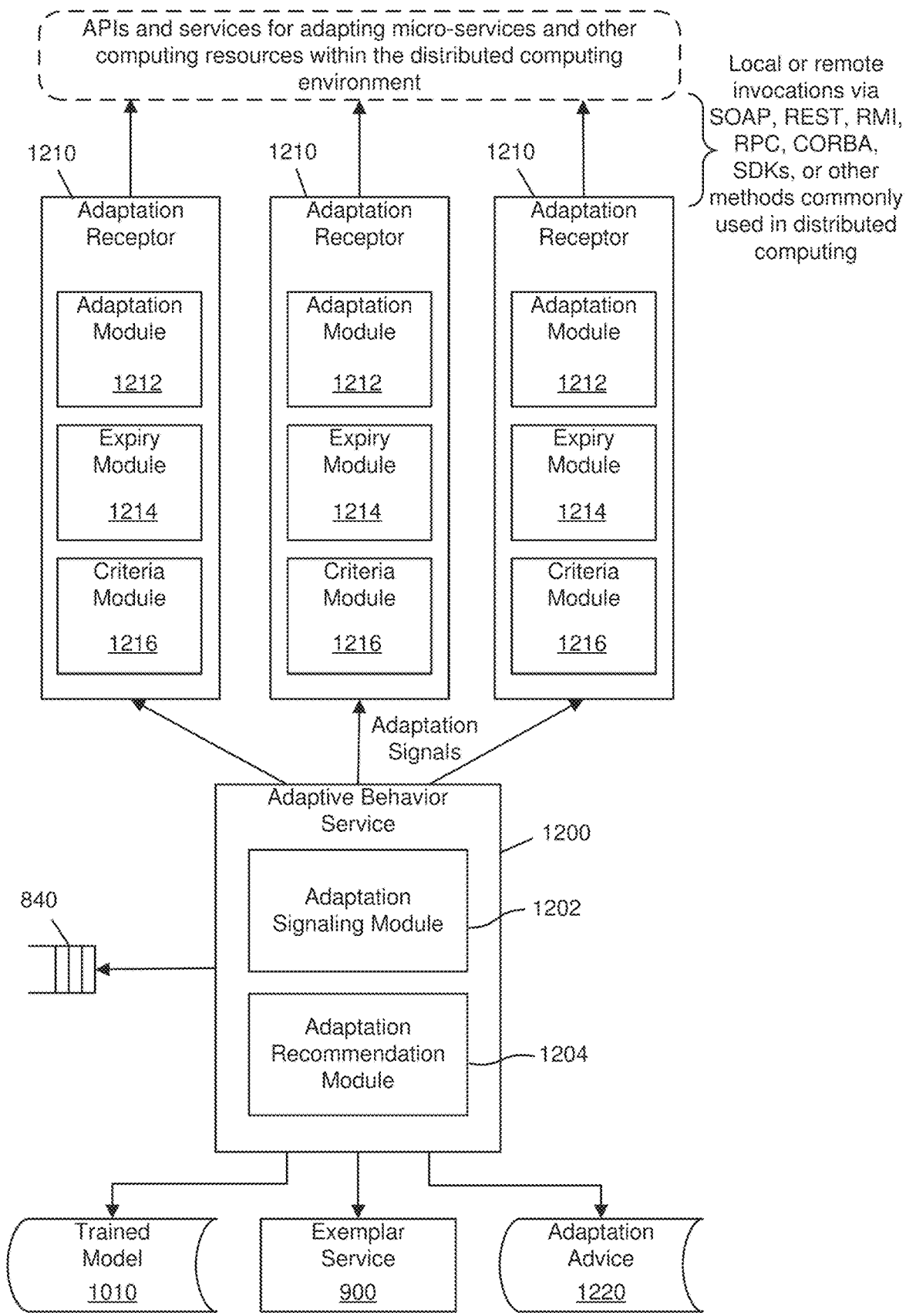
FIG. 12A illustrates a system for adapting services and resources in a distributed computing environment based on context data and defined exemplars according to an example of the present invention.

FIG. 12A illustrates an adaptive behavior service 1200 that may contain one or more executable modules for adapting services and resources in the distributed computing environment 100 as needed based on context data and calculated exemplars scores. An adaptive behavior service 1200 may contain an adaptation signaling module 1202 and an adaptation recommendation module 1204. FIG. 12A also illustrates adaptation receptors 1210, which may contain one or more executable modules for receiving adaptation signals and adapting services or resources in the distributed computing environment 100. An adaptation receptor 1210 may contain an adaptation module 1212, an expiry module 1214, and/or a criteria module 1216.

When a context event is placed on the context subscription queue 840, the data may be consumed by the adaptive behavior service 1200. The adaptation recommendation module 1204 may communicate the most recent context data to the exemplar service 900 to generate new exemplar scores. The adaptation recommendation module 1204 may then use the trained model 1010 to evaluate the current context information and exemplar scores to determine if any adaptations are needed to improve or maintain the exemplar scores. If adaptations are recommended, the adaptive behavior service 1200 may store the recommendations in the adaptation advice data store 1220. Furthermore, if adaptations are recommended, the adaptation signaling module 1202 may encapsulate one or more adaptation records into adaptation signals and communicate them to one or more adaptation receptors 1210. The communication with the adaptation receptors 1210 may be done via a pub/sub messaging invention or via web service API calls.

Note that the adaptive behavior service 1200 may be configured to operate in an advisor mode. In this mode, the adaptation recommendation module 1204 may make recommendations using the exemplar service 900 and the trained model 1010 and store the recommendations in the adaptation advice data store 1220. However, in advisor mode the adaptation signaling module 1202 may not emit adaptation signals so that no adaptations are actually made. The recommendations stored in the adaptation advice data store 1220 may be made available for searching and analytics via configuration and management APIs 1400, which may be exposed via a graphical user interface 1410.

Figure 12B:
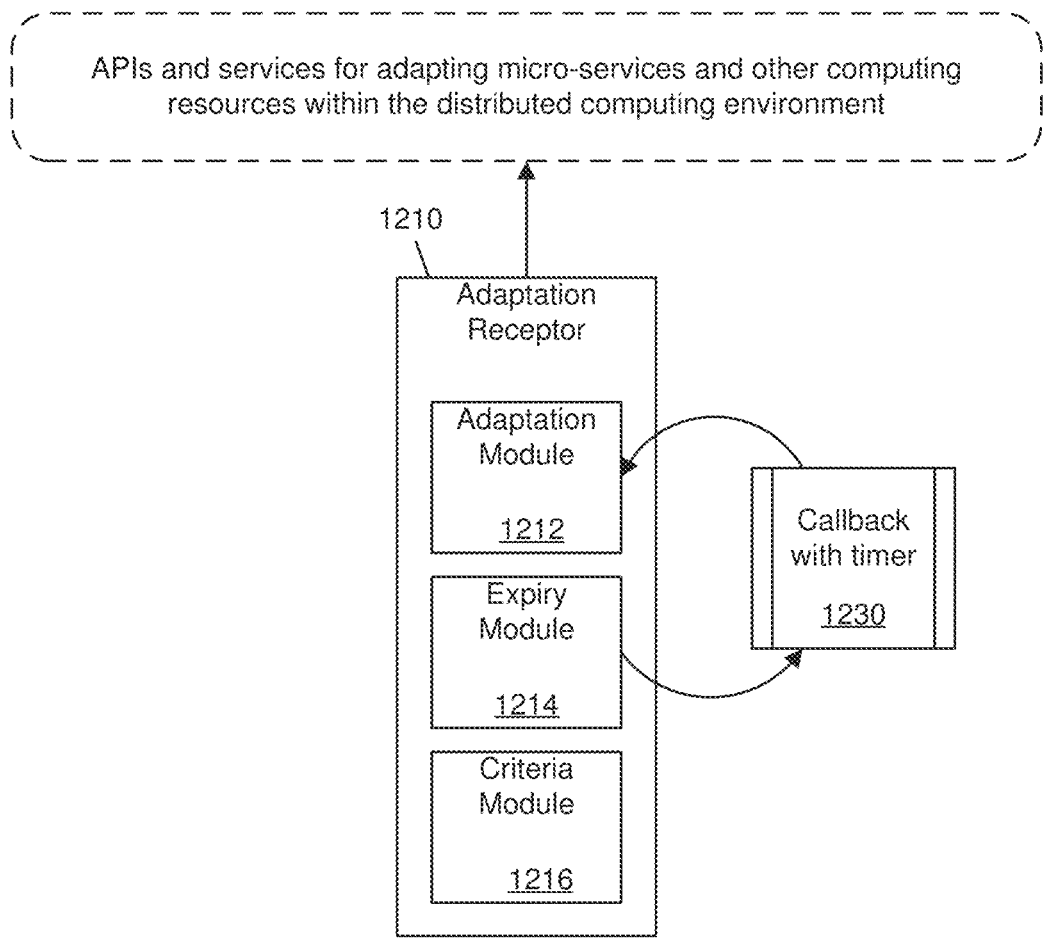
FIG. 12B illustrates a system for expiring and reversing adaptations made to services and resources in a distributed computing environment if those adaptations are configured to expire according to an example of the present invention.

The criteria module 1216 may evaluate any preconditions, limits, or other criteria defined in the adaptation record 625. If adaptation record criteria are satisfied, the adaptation module 1212 may adapt services and resources in the distributed computing environment 100 by making API calls or other methods as defined in the adaptation record 625. If an expiry is defined in the adaptation record 625, then the expiry module 1214 may create a process to expire or reverse the adaptation at a future time. FIG. 12B illustrates an example of how this may be done using a callback process with a timer 1230.

Figure 12C:
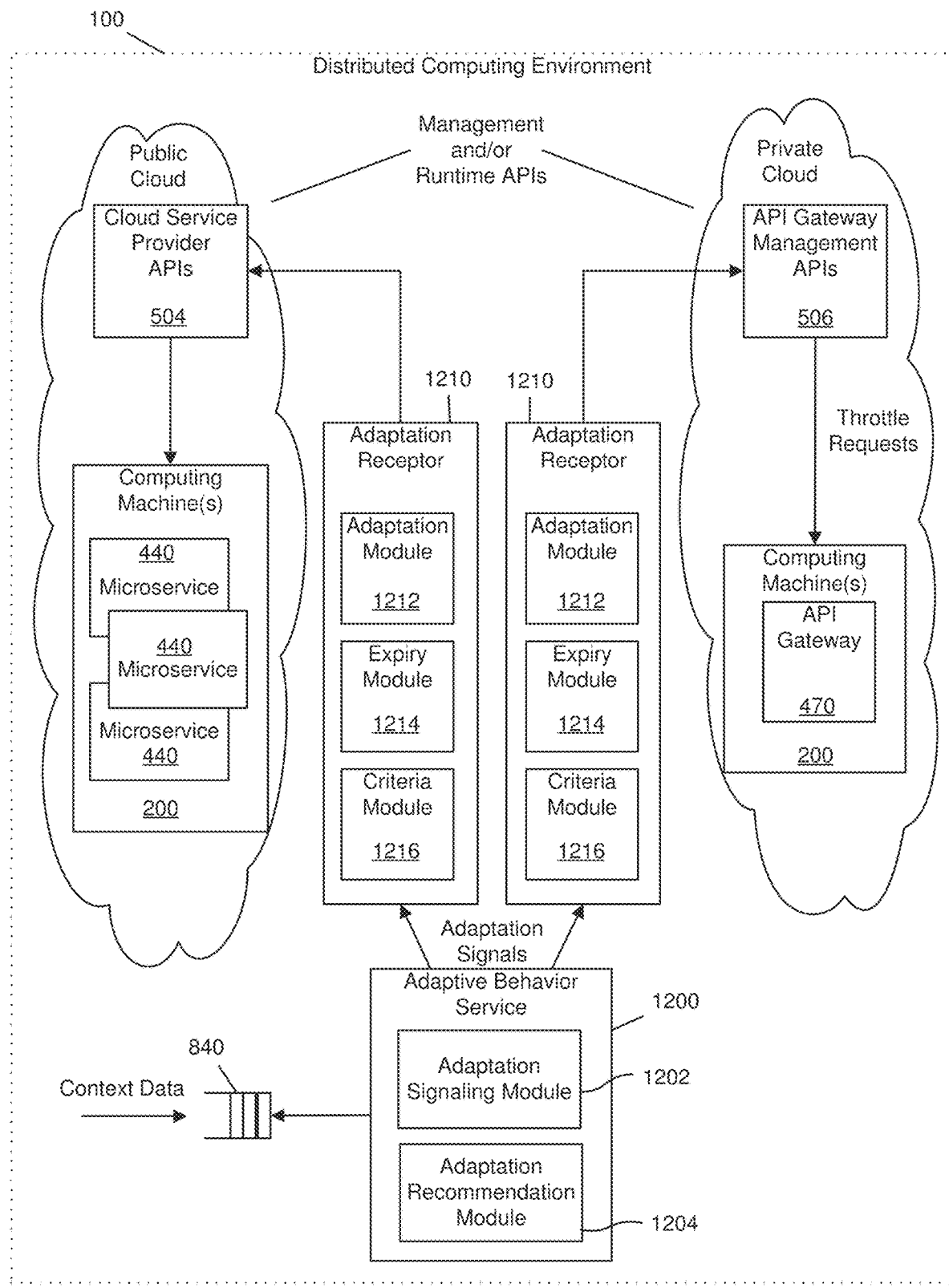
FIG. 12C is a block diagram that illustrates an example of how components of the present invention may adapt services and resources in a distributed computing environment according to an example of the present invention.

FIG. 12C shows an example of how the adaptive behavior service 1200 and adaptation receptors 1210 may work together to adapt resources. FIG. 12C shows how one adaptation receptor 1210 may make API calls to one or more cloud service provider APIs 504 to adapt micro-services 440 that may be executing on computing machines 200 within the public cloud infrastructure. For example, the adaptation action could result in increasing the number of running instances of a micro-service 440 or any other adaptation supported by the cloud service provider APIs 504. FIG. 12C also shows an example of an adaptation receptor 1210 making API calls to one or more API gateway management APIs 506 to adapt and regulate an API gateway 470 executing on one or more computing machines 200 in a private cloud environment. For example, the adaptation action could result in throttling up or down the number of requests that are forwarded to a service, adjusting an API timeout value, or any other adaptation supported by the API gateway management APIs 506.

Figure 13:
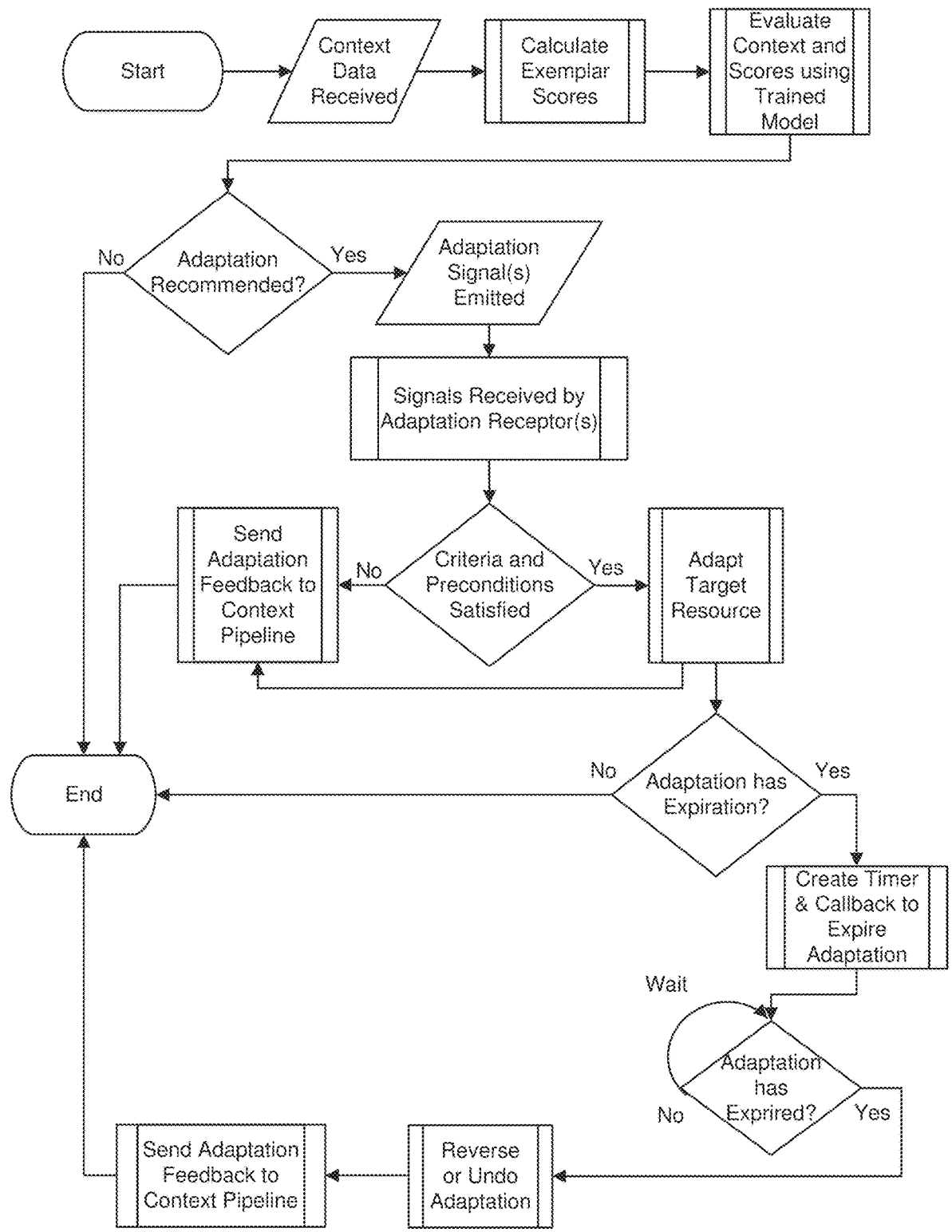
FIG. 13 is a flowchart of an example method for adapting services or resources in a distributed computing environment based on received context data according to an example of the present invention.

FIG. 13 is a flowchart that illustrates one example of how the executable steps disclosed herein may be sequenced to achieve and maintain the highest possible exemplar scores given the current context of the distributed computing environment 100. Note that adaptation receptors 1210 may send context information to the context pipeline 800 after an adaptation is made, an adaptation is expired, or if the adaptation record criteria 625 is not satisfied.

Figure 14:
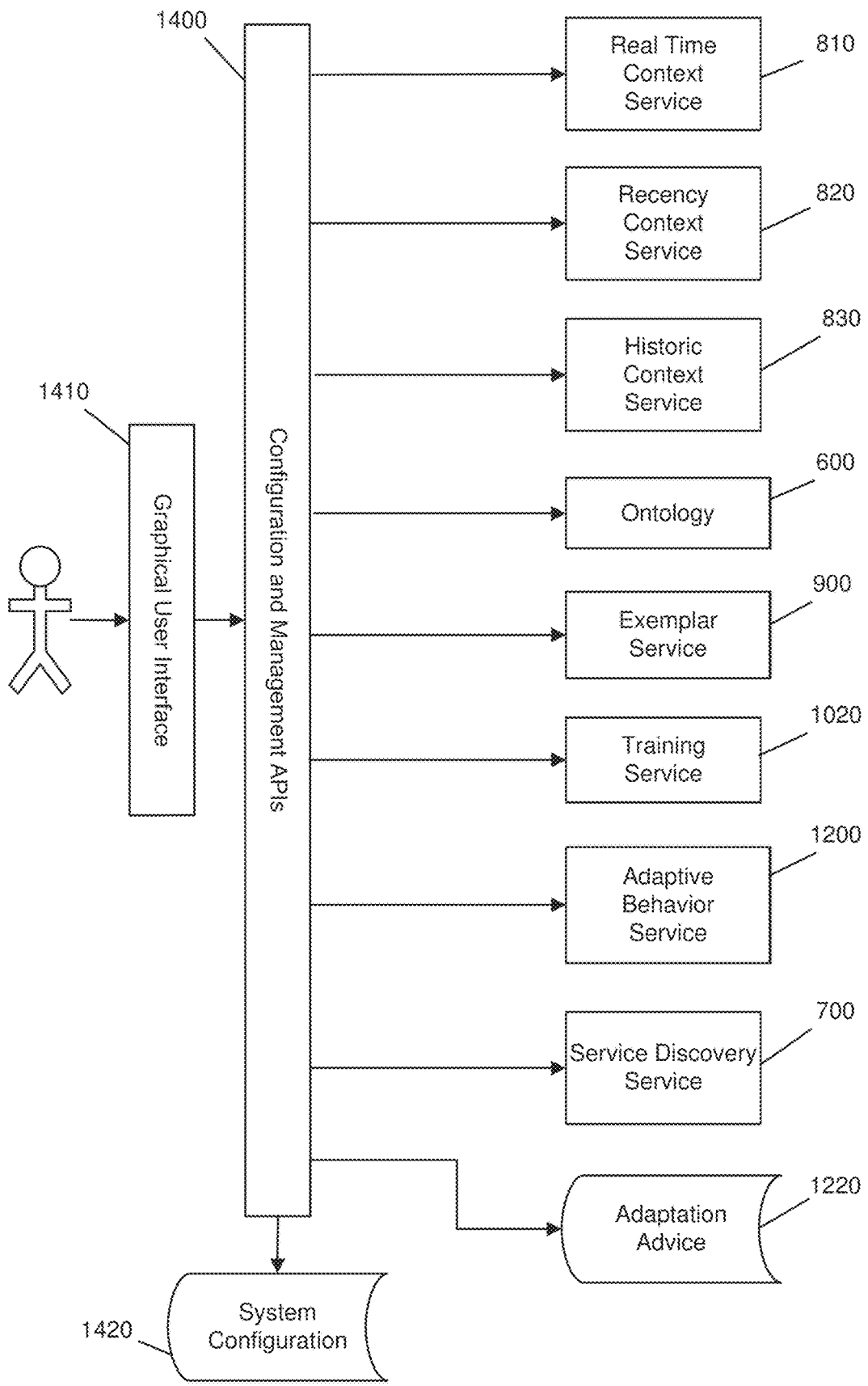
FIG. 14 illustrates a system and method for managing, configuring, and administering various components and systems that comprise the present invention according to an example of the present invention.

FIG. 14 shows configuration and management APIs 1400 that may provide programming interfaces into various services and components of the present invention. These APIs may be used to configure, edit, operate, inspect, analyze, and/or monitor various aspects of the present invention. A system configuration data store 1420 may store configuration data for the APIs and/or the services and components of the present invention. Alternatively, configuration data for each service or component may be stored separately. A graphical user interface 1410 may provide visual representations of the data and actions enabled by the configuration and management APIs 1400. In addition to the graphical user interface 1410, the configuration and management APIs 1400 may be accessible by any other consumer via web service API calls.

Figure 15:
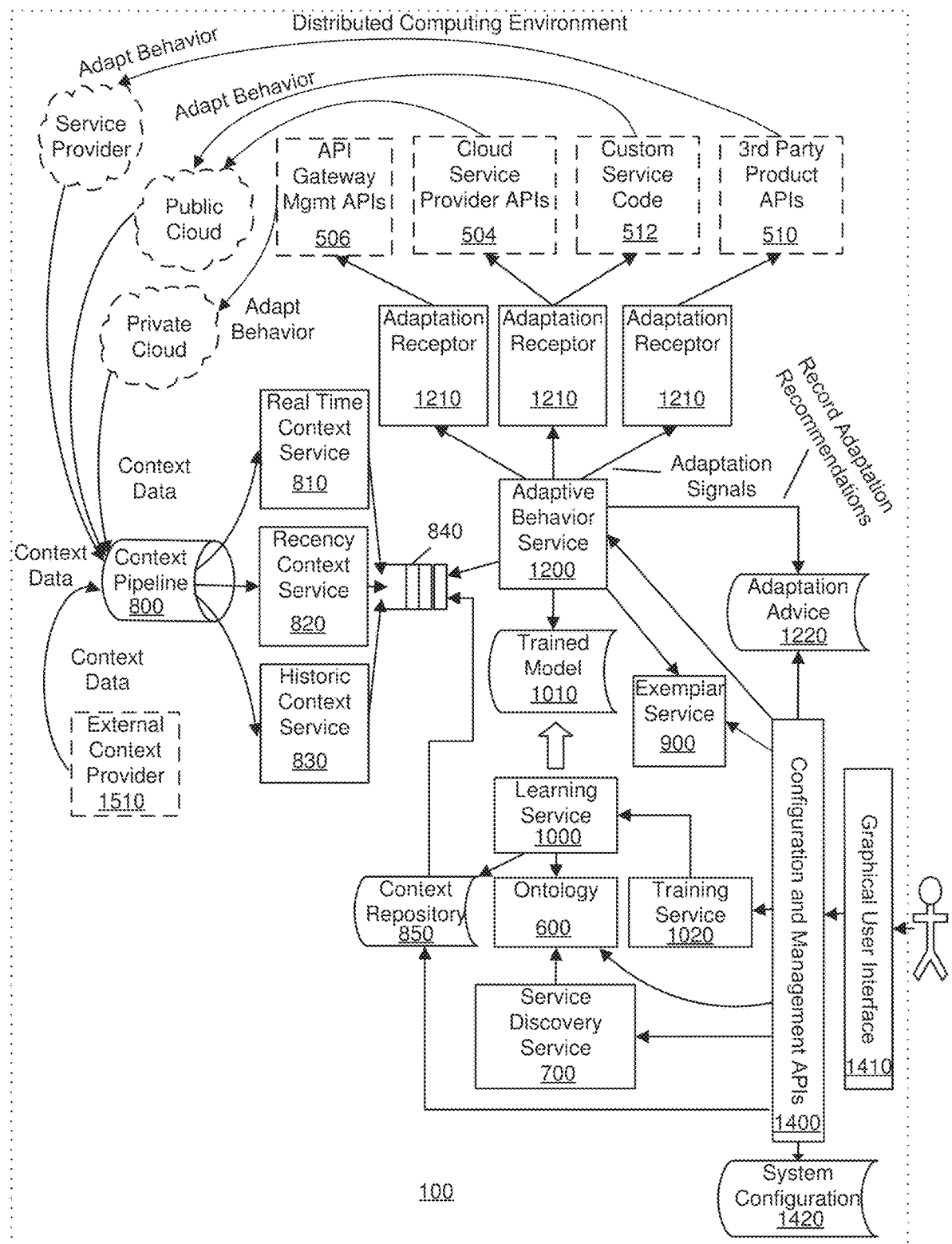
FIG. 15 is a block diagram that illustrates an example architecture of the present invention and how some of its systems and components may interact with each other according to an example of the present invention.

FIG. 15 illustrates an example architecture of the present invention and how some systems and components of the present invention may interact with each other according to an example of the present invention. In FIG. 15 the following adaptations are illustrated: API gateway management APIs 506 are used to adapt API gateway settings in a private cloud; cloud service provider APIs 504 are used to adapt services and resources in a public cloud; custom service code 512 is used to adapt the behavior of micro-services; and third party product APIs 510 are used to adapt and regulate third party products in a public cloud. Also, in this example, an external context provider 1510 is providing context data to the context pipeline 800. An external context provider 1510 may provide context data from outside the distributed system, but this data may still provide meaningful context to help adapt and optimize services and resources. For example, market conditions, inventory levels, supply and demand data, to name a few, may be useful to make proactive adaptations. For example, consider a travel booking system for which current or forecasted weather conditions may impact the volume and types of requests received by the system. This context information may be used to proactively adapt services and/or resources to achieve or maintain optimal exemplar scores.

Figure 16:
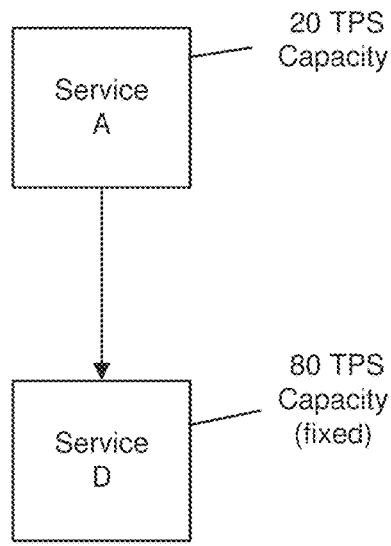
FIG. 16 is a block diagram illustrating an example of one micro-service calling a second service that has a fixed capacity in a distributed computing environment.
Figure 17:
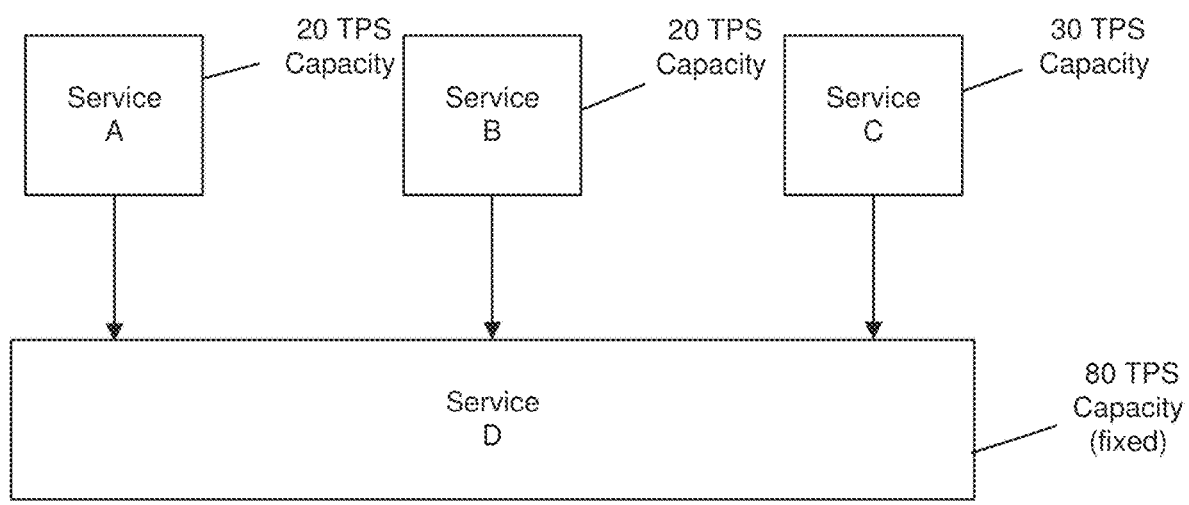
FIG. 17 is a block diagram illustrating an example of three micro-services calling a fourth service that has a fixed capacity in a distributed computing environment.
Figure 18:
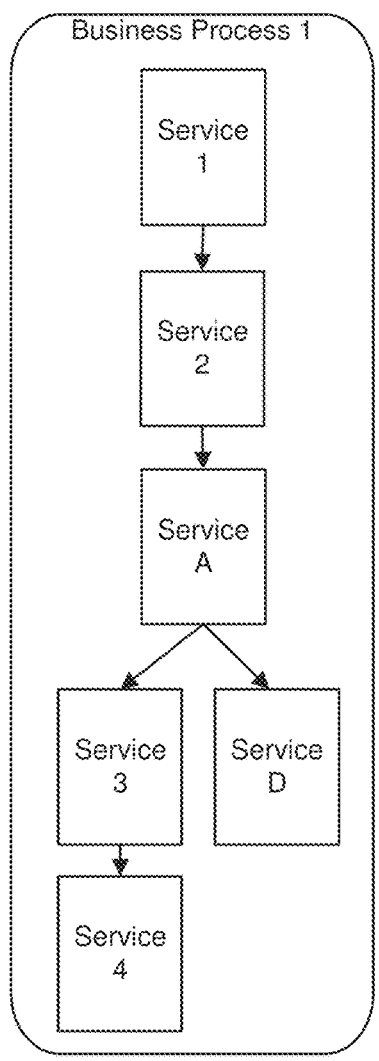
FIG. 18 is a block diagram illustrating an example of a business process that is comprised of multiple micro-services and computing resources in a distributed computing environment that collaborate to achieve a desired business value or outcome.
Figure 19:
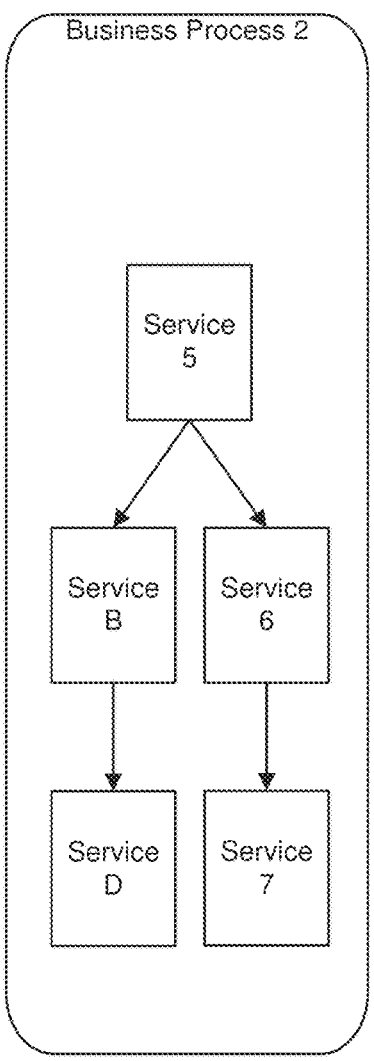
FIG. 19 is a block diagram illustrating an example of a second business process that is comprised of multiple micro-services and computing resources in a distributed computing environment that collaborate to achieve a desired business value or outcome.
Figure 20:
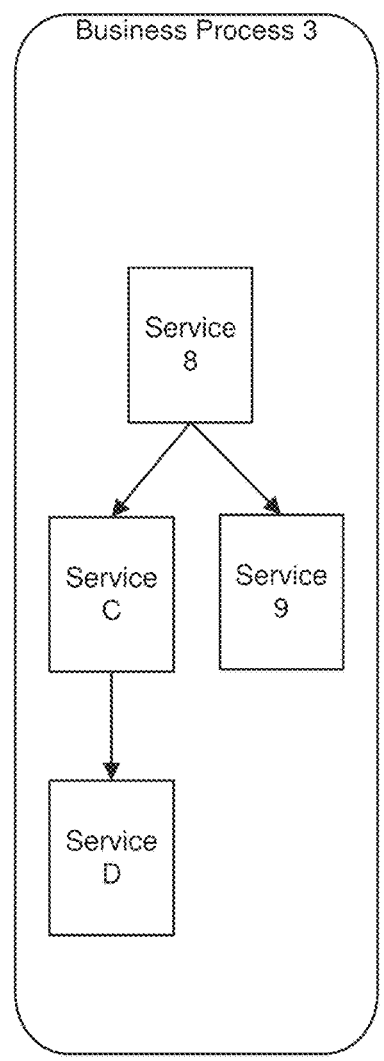
FIG. 20 is a block diagram illustrating an example of a third business process that is comprised of multiple micro-services and computing resources in a distributed computing environment that collaborate to achieve a desired business value or outcome.

For an example of how the present invention can use context information from the distributed computing environment 100 to adapt services in ways that cannot be done with local context information, consider two services A and D as shown in FIG. 16. Service A and its allocated computing resources are configured and provisioned to serve 20 transactions per second (TPS). However, service A is elastically scalable. Service A calls Service D, which is not scalable and has a fixed capacity of 80 TPS. If requests for service A increase to 40 TPS, how should service A be adapted? With no other information, it may seem logical to scale service A to be able to handle 40 TPS. However, consider having additional context information revealing that two other services B and C also call service D as shown in FIG. 17. Services B and C are also elastically scalable and are configured to serve 20 and 30 TPS, respectively. With this information, it is obvious that scaling service A to handle 40 TPS may exceed the fixed capacity of service D when combined with services B and C. So, how should the fixed capacity of D be distributed across services A, B, and C? Additional context information revealing the current number of requests being served by B and C would be helpful. For example, if service C has been receiving an average of only 10 TPS recently, it may be safe to scale service A without impacting service D and its consumers. However, consider another scenario where service requests received by all three services A, B, and C have doubled compared to their configurations of 20, 20, and 30 TPS respectively. Having this contextual information is helpful, but it is still not enough to make a meaningful decision about how to adapt these services and to allocate resources. Exemplars provided by the present invention can be helpful in this situation because they provide a method for prioritizing and scoring computer implemented business processes relative to each other. Services supporting the most critical and valuable processes can be given preferential consideration when resources are scarce as described in the last example. FIGS. 18, 19, and 20 show examples of how services may collaborate to perform three hypothetical business processes. An exemplar can be defined to represent each of the three business processes, and the calculated exemplar scores can be used to adapt services and allocate resources to achieve the highest exemplar scores and consequently to optimize and protect critical business processes.

Figure 21A:
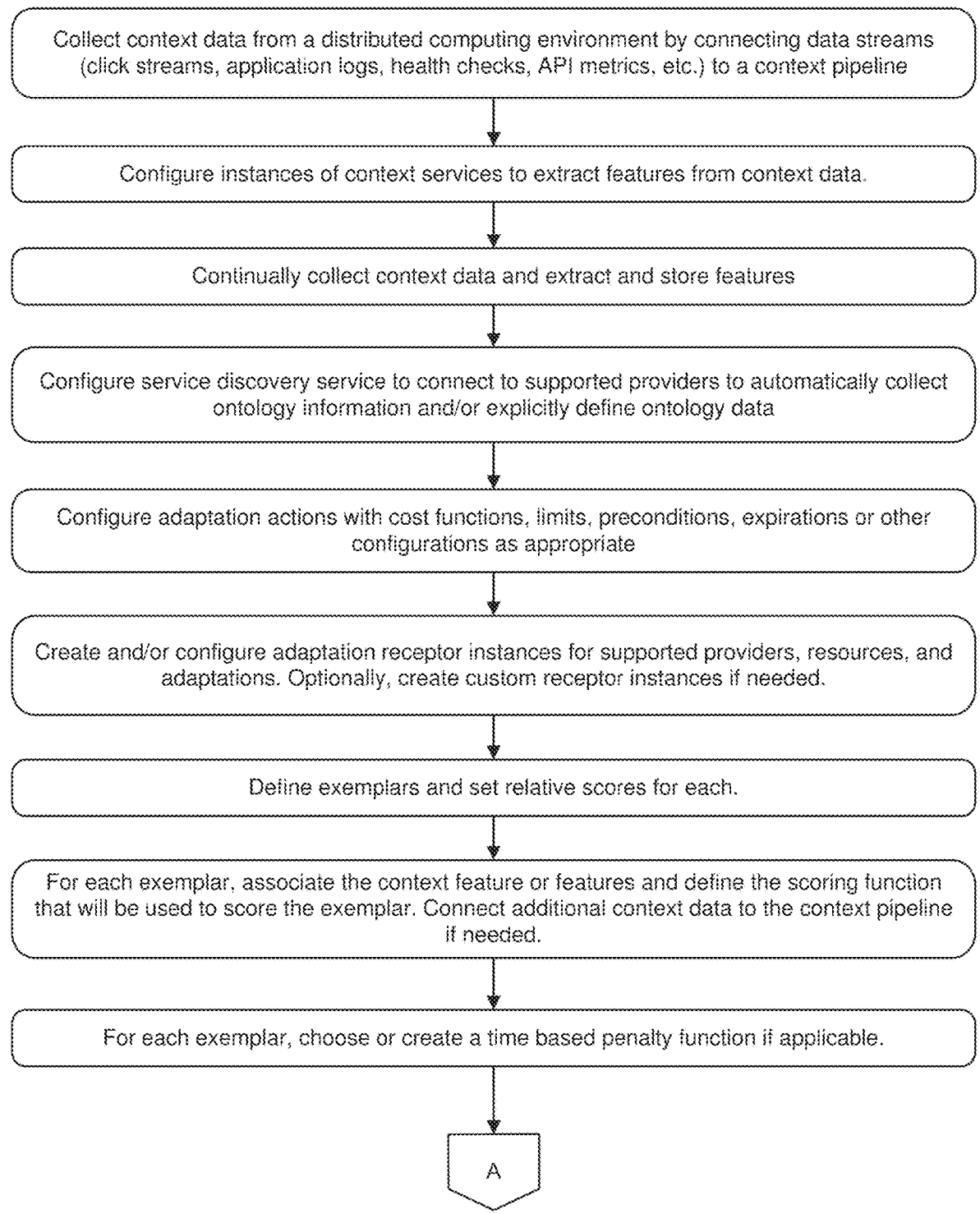
FIGS. 21A-C show a flowchart that illustrates an example computerized method of adapting services in a distributed computing environment using context data and defined exemplars according to an example of the present invention.
Figure 21B:
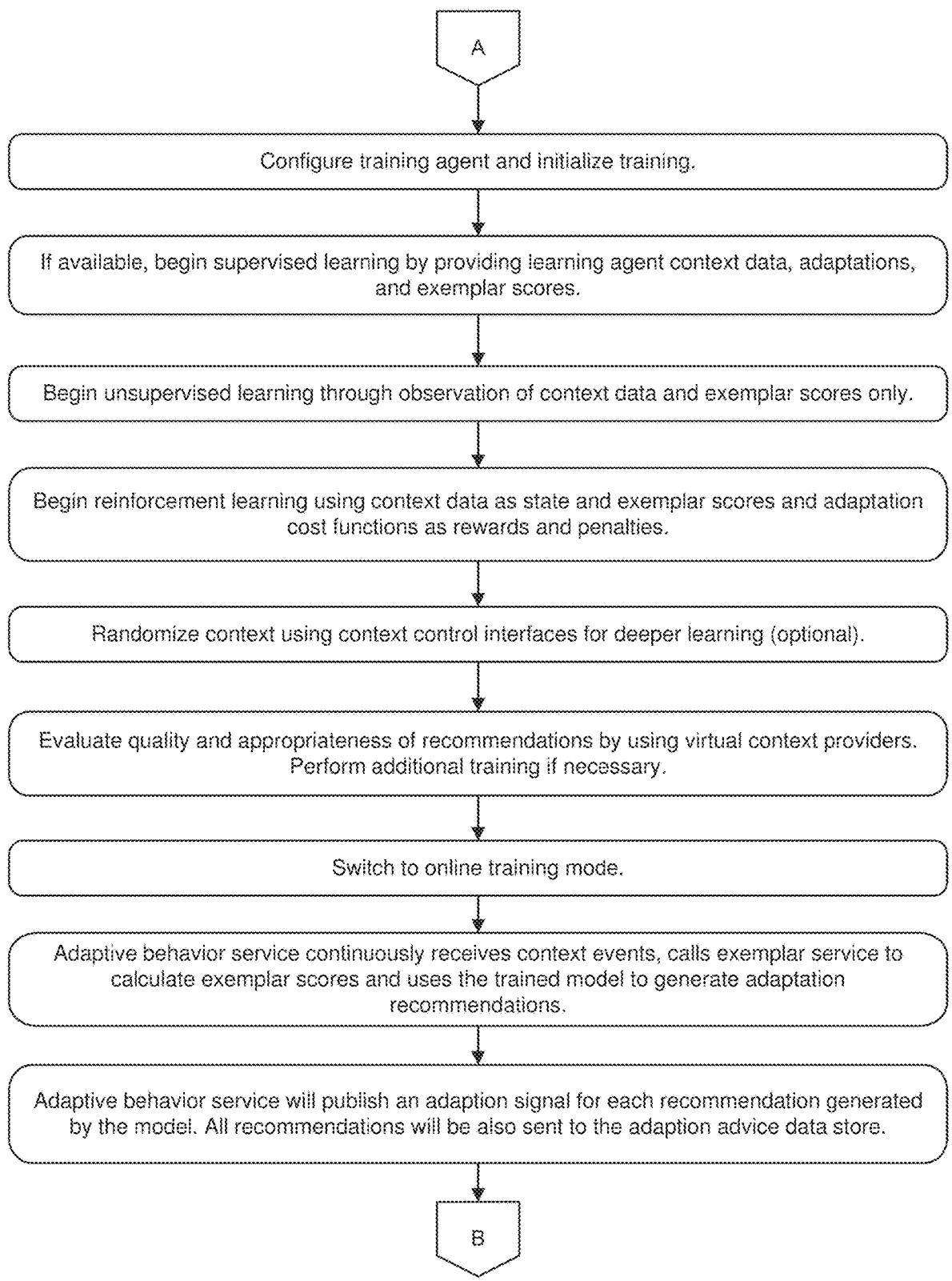
Figure 21C:
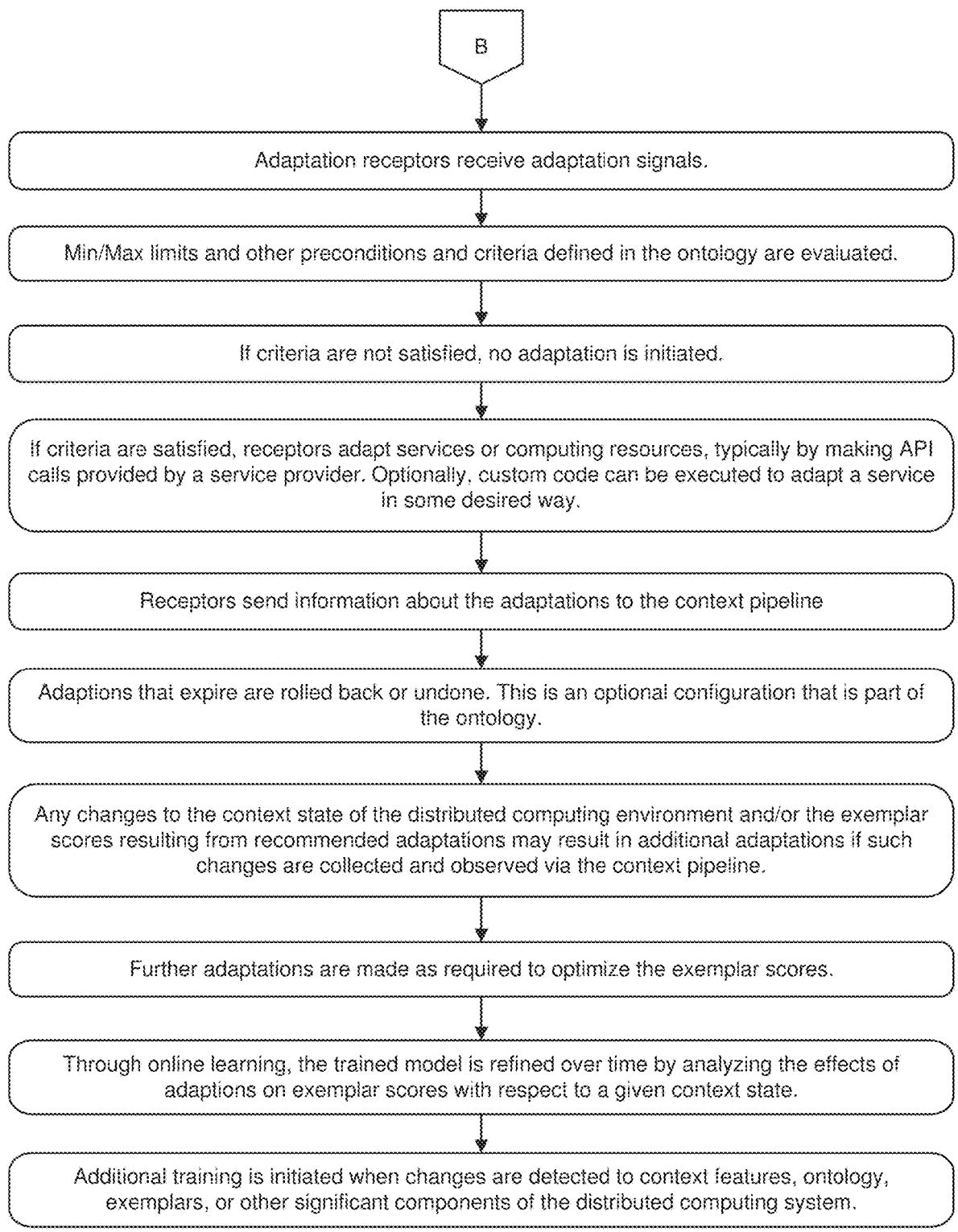

FIGS. 21A-C show a flowchart that depicts an example of how executable steps may be ordered and sequenced in the present invention to adapt services and resources based on contextual information and defined exemplars. This flow is for illustrative purposes and is intended to convey understanding and enablement to those skilled in the art. However this is only one example and the actual flow or sequence of steps may vary. For example, some steps may be sequenced in a different order, some may be executed concurrently or asynchronously, some steps may be omitted, and other additional, alternative, or equivalent steps that would be known to one skilled in the art may be added to the flow.

FIG. 22 is a flowchart of a computerized method of calculating a score characterizing a computing process executed in a distributed computing environment, according to an illustrative embodiment of the invention. In a first step 2205, a computing device receives, from a first data store in electronic communication with the computing device, one or more numerical features representing an aspect of execution performance of the computing process. In a second step 2210, the computing device receives, from a second data store in electronic communication with the computing device, a set of numerical multipliers including a numerical multiplier for each feature, each numerical multiplier based on a significance of the associated execution performance aspect of the computing process to the computing process. In a third step 2215, the computing device calculates the score based on a sum of features weighted by their associated numerical multipliers, the score indicating a performance of the computing process.

FIG. 23 is a flowchart of a computerized method of calculating a score characterizing a computing objective utilizing a set of computing processes executed in a distributed computing environment, according to an illustrative embodiment of the invention. In a first step 2305, a computing device receives, from a first data store in electronic communication with the computing device, a set of process scores, each process score representing a performance of one computing process in the set of computing processes. In a second step 2310, the computing device receives, from a second data store in electronic communication with the computing device, a set of numerical multipliers, each numerical multiplier associated with one computing process and based on a significance of an execution performance aspect of the computing process relative to the computing objective. In a third step 2315, a computing device calculates a computing objective score based on a sum of the process scores weighted by their associated numerical multipliers, the computing objective score indicating a performance of the computing objective.

FIG. 24 is a flowchart of a computerized method of training a computing device to optimize a computing objective utilizing a set of computing processes executed in a distributed computing environment, according to an illustrative embodiment of the invention. In a first step 2405, a context pipeline of a distributed computing system collects context data reflecting a set of computing processes executed within the distributed computing system. In a second step 2410, a context services module of the distributed computing system extracts, from the context data, one or more features for each computing process in the set of computing processes, the one or more features representing an aspect of execution performance of the respective computing process. In a third step 2415, the features are stored in a context data store of the distributed computing system. In a fourth step 2420, a service discovery service module of the distributed computing system is configured to collect ontology information and define ontology data for the distributed computing system. In a fifth step 2425, an ontology manager service module of the distributed computing system configures at least one adaptation record, representing an adaptation action, of the distributed computing system, the at least one adaptation action having at least one cost function, limit, precondition, or expiration. In a sixth step 2430, the adaptation behavior service module sends adaptation signals to at least one adaptation receptor module to initiate adaptation actions. In a seventh step 2435, an exemplar service module of the distributed computing system defines one or more exemplars, each exemplar having a score reflecting a performance of one associated computing process in the set of computing processes. In an eighth step 2440, the exemplar service module defines, for each exemplar, a scoring function for scoring the exemplar based on the context features associated with the exemplar.

FIG. 25 is a flowchart of a computerized method of optimizing a computing objective utilizing a set of computing processes executed in a distributed computing environment, according to an illustrative embodiment of the invention. In a first step 2505, a context pipeline of a distributed computing system receives context data reflecting a set of computing processes of the distributed computing system. In a second step 2510, a context services module of the distributed computing system extracts, from the context data, one or more features for each computing process in the set of computing processes, the one or more features representing an aspect of execution performance of the respective computing process. In a third step 2515, the features are stored in a context data store of the distributed computing system. In a fourth step 2520, the features are provided to an adaptive behavior service module of the distributed computing system via an electronic data communication. In a fifth step 2525, an exemplar service module is called, by the adaptive behavior service module, to calculate a score for each computing process, the score based on a numerical sum of features weighted by associated numerical multipliers, each associated numerical multiplier reflecting a weight of each feature, the score indicating a performance of the computing process.

It should also be understood that various aspects and embodiments of the invention can be combined in various ways. Based on the teachings of this specification, a person of ordinary skill in the art can readily determine how to combine these various embodiments. In addition, modifications may occur to those skilled in the art upon reading the specification.

What is claimed is:

1. A computing system for optimizing performance of a computing objective utilizing a set of computing processes executed in a distributed computing system, the computing system comprising a computing device having a memory for storing computer-executable instructions and a processor that executes the computer-executable instructions to:
   collect, by a context pipeline module of the computing device, context data characterizing one or more performance aspects of each computing process in the set of computing processes;
   extract, by a context services module of the computing device, one or more features from the context data;
   store, by a context data store of the computing device, the extracted features;
   determine, by an ontology manager module of the computing device, allowed adaptation actions of the distributed computing system;
   receive, by the ontology manager module, computing resource definition records of the distributed computing system;
   create, by the ontology manager module, adaptation definition records reflecting adaptation actions utilized in the distributed computing system;
   define, by an exemplar service module of the computing device, an exemplar model for each computing process, each exemplar reflecting a performance of the computing process;
   determine, by the exemplar service module, ideal scores for each exemplar model according to their significances to the computing objective;
   calculate, by the exemplar service module, exemplar scores using the features extracted from the context data; and
   determine, by a learning service module of the computing device based on a current context state of the distributed computing system, adaptations to utilize in the distributed computing system in accordance with the allowed adaptation actions determined by the ontology manager module.

2. The computing system of claim 1, the computing device further including an adaptive behavior service module that executes the determined adaptations in the distributed computing system.

3. The computing system of claim 1, wherein the context services module is configured to engineer the extracted features, scale the extracted features, or both engineer and scale the extracted features for calculating the representation of the computing objective.

4. The computing system of claim 1, wherein the context data includes at least one of API metrics, click stream data, access logs, third party data, batch process data, application logs, or health check data.

5. The computing system of claim 1, wherein the ontology manager module determines allowed adaptation actions for multiple services and resources of the distributed system.

6. The computing system of claim 1, wherein the adaptive behavior service module publishes determined adaptations as adaptation signals, communicates determined adaptations as adaptation signals via direct API calls, or both.

7. The computing system of claim 1, the computing device further including a training service module that facilitates training activities to optimize learning and reduce training time.

8. The computing system of claim 7, the computing device further including one or more context control interfaces to allow the training service module to manipulate services or resources of the distributed computing system to affect the context data.

9. The computing system of claim 1, the computing device further including a service discovery service module that automatically discovers services and resources in the distributed computing system and adds them to the ontology manager module.

10. The computing system of claim 1, the computing device further including a context based rules engine module that prescribes one or more actions when a context state of the distributed computing system satisfies one or more predefined criteria.

11. The computing system of claim 1, the computing device further including a batch context learning service module that learns how to use context data that is processed in batch instead of, or in addition to, context data that is streamed in real time or near-real time.

12. The computing system of claim 1, the computing device further including one or more virtual context provider modules that artificially modify context data to simulate context changes to evaluate adaptations recommended by at least one of a trained model or a context based rule engine module.

13. The computing system of claim 1, wherein the system is capable of operating in an advisor mode to record adaptation recommendations without adapting or changing any system resources or services, send alerts for some or all adaptation recommendations, or both.

14. The computing system of claim 1, wherein the learning service module is trained on past context data using one or more supervised or unsupervised algorithms.

* * * * *